(12) United States Patent
Wang et al.

(10) Patent No.: US 12,717,096 B2
(45) Date of Patent: Aug. 25, 2026

(54) INTEGRATED FIBER ARRAY UNIT STRUCTURE INCLUDING EMBEDDED PASSIVE OPTICAL COMPONENTS AND METHOD FOR FORMING THE SAME

(71) Applicant: Taiwan Semiconductor Manufacturing Company, Ltd., Hsinchu (TW)

(72) Inventors: Chao-Jen Wang, Hsinchu City (TW); Tsung-Fu Tsai, Changhua County (TW); Szu-Wei Lu, Hsinchu City (TW); Chen-Hua Yu, Hsinchu City (TW); Yenju Liang, Taipei City (TW); Shih-Wei Liang, Taichung City (TW); Jiun-Yi Wu, Taoyuan City (TW); Shou-Yi Wang, Hsinchu City (TW); Kai-Hung Lo, Chiayi City (TW); Chia-Ning Weng, Taichung City (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 301 days.

(21) Appl. No.: 18/402,918

(22) Filed: Jan. 3, 2024

(65) Prior Publication Data

US 2025/0199251 A1 Jun. 19, 2025

Related U.S. Application Data

(60) Provisional application No. 63/609,402, filed on Dec. 13, 2023.

(51) Int. Cl.
*G02B 6/42* (2006.01)

(52) U.S. Cl.
CPC ......... *G02B 6/4214* (2013.01); *G02B 6/4204* (2013.01); *G02B 6/4239* (2013.01); *G02B 6/4243* (2013.01); *G02B 6/4244* (2013.01)

(58) Field of Classification Search
CPC ...... G02B 6/32; G02B 6/3616; G02B 6/3628; G02B 6/3648; G02B 6/3652; G02B 6/4204; G02B 6/4214
See application file for complete search history.

(56) References Cited

U.S. PATENT DOCUMENTS

2002/0015557 A1* 2/2002 Yap ..................... G02B 6/4204 385/33
2004/0264856 A1* 12/2004 Farr ..................... G02B 6/4225 385/33
2016/0231513 A1* 8/2016 Butler ................. G02B 6/3893

(Continued)

*Primary Examiner* — Michael Stahl
(74) *Attorney, Agent, or Firm* — McClure, Qualey & Rodack, LLP

(57) ABSTRACT

A fiber array unit (FAU) structure and the method for forming the same are provided. The FAU structure includes a FAU, a passive optical component structure, and a carrier board. The FAU includes a fiber holder holding optical fibers. The passive optical component structure includes a reflective layer and a lens layer. The reflective layer includes reflectors adjacent to the optical fibers. The lens layer includes silicon lenses adjacent to the reflectors. The carrier board is configured to support the FAU and the passive optical component structure. The FAU and the passive optical component structure are adjacent to each other. The lens layer is located between the reflective layer and the carrier board.

20 Claims, 26 Drawing Sheets

(56) References Cited

U.S. PATENT DOCUMENTS

| | | | | |
|---|---|---|---|---|
| 2021/0181423 | A1* | 6/2021 | Miao | G02B 6/32 |
| 2021/0239908 | A1* | 8/2021 | Ishii | G02B 6/30 |
| 2024/0411093 | A1* | 12/2024 | Liang | G02B 6/4207 |

* cited by examiner

INTEGRATED FIBER ARRAY UNIT STRUCTURE INCLUDING EMBEDDED PASSIVE OPTICAL COMPONENTS AND METHOD FOR FORMING THE SAME

CROSS REFERENCE

This application claims the benefit of U.S. Provisional Application No. 63/609,402, filed on Dec. 13, 2023, the entirety of which is incorporated by reference herein.

BACKGROUND

Optical signaling and processing has been used in an increasing number of applications in recent years, due to the increased use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission, as well as for processing and control. Accordingly, devices that integrate optical components and electrical components are used to convert between optical signals and electrical signals, as well as for the processing of optical signals and electrical signals. Packages (also referred to as photonic packages) may therefore include both photonic dies with optical devices and electronic dies with electronic devices.

A fiber array unit (FAU) typically has multiple grooves, with an optical fiber held within each groove, and it may be used to optically couple optical fibers to optical couplers within the photonic die of a photonic package. Optical glue may be used to attach the FAU to the photonic package. After the optical glue has been dispensed between the FAU and the photonic package, it can be cured, e.g., by ultraviolet (UV) curing.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
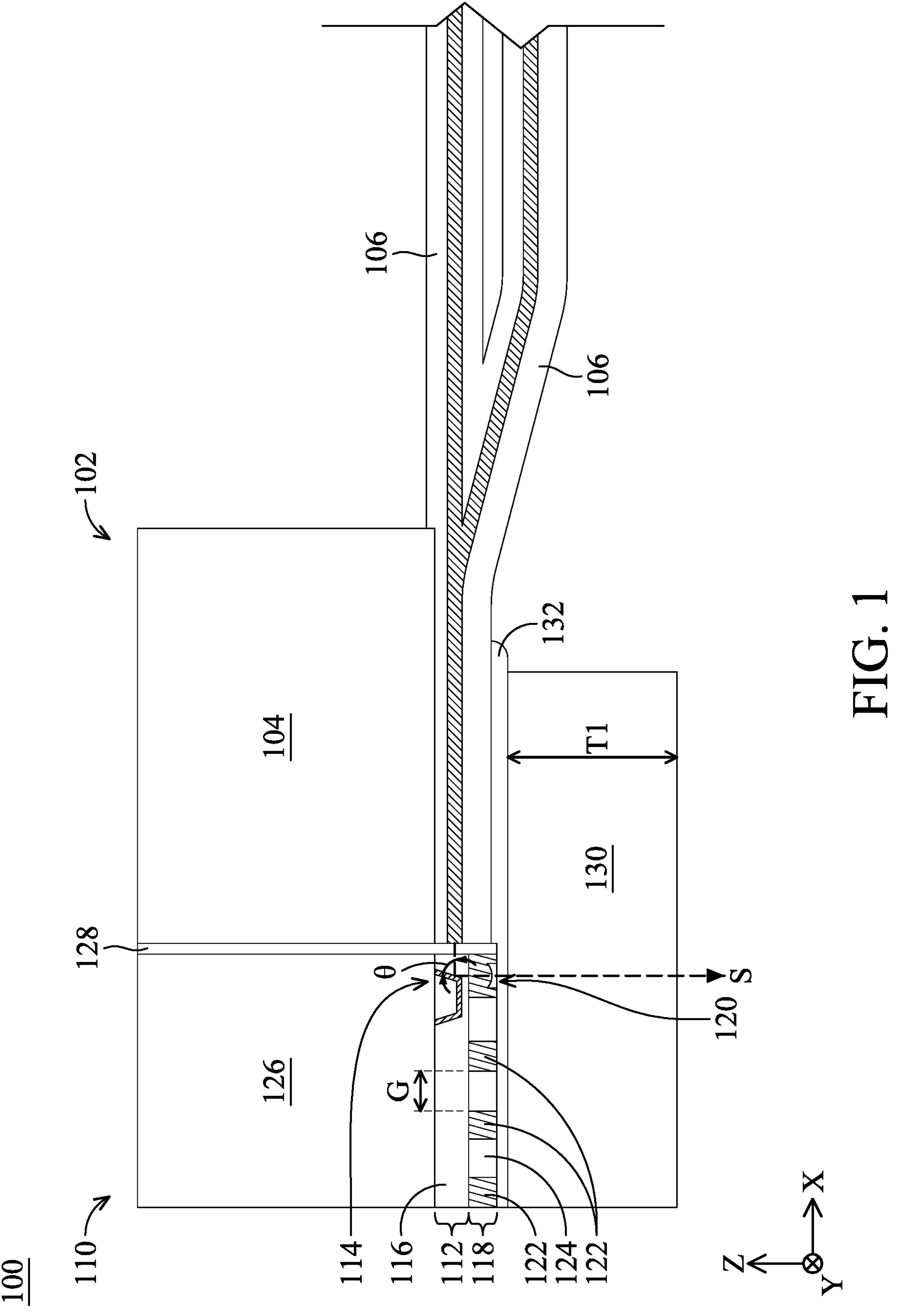
FIG. 1 illustrates a cross-sectional view of an integrated fiber array unit (FAU) structure, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The system may be otherwise oriented (rotated 90 degrees or at other orientations) and the spatially relative descriptors used herein may likewise be interpreted accordingly.

An integrated fiber array unit (FAU) structure and the method for forming the same are provided in accordance with some embodiments of the present disclosure. The integrated FAU structure disclosed herein integrates a FAU holding optical fibers and a light guide structure, wherein the light guide structure may include various passive optical components, such as reflectors, lens, waveguides, and/or beam splitters to help guide the light beams from the optical fibers to a photonic package and/or modify the light beam. This eliminates the need for additional passive optical components outside of the FAU structure, helping to reduce package size of the semiconductor package/system. In some embodiments, the passive optical components are embedded within the light guide structure and are not exposed. In this manner, the risk of damage to the passive optical components during assembly of the integrated FAU structure and the photonic package is reduced. Accordingly, the product yield and reliability of the integrated FAU structure are improved. In some embodiments, the integrated FAU structure also includes a carrier board or an L-shaped carrier to support the FAU and the light guide structure, thereby improving the structural stability of the integrated FAU structure.

The Embodiments discussed herein provide examples to enable making or using the subject matter of this disclosure, and a person having ordinary skill in the art will readily understand that modifications can be made while remaining within the contemplated scope of different embodiments. Throughout the various views and illustrative embodiments, like reference numbers are used to designate like elements.

Although method embodiments may be discussed as being performed in a particular order, other method embodiments may be performed in any logical order.

Figure 2B:
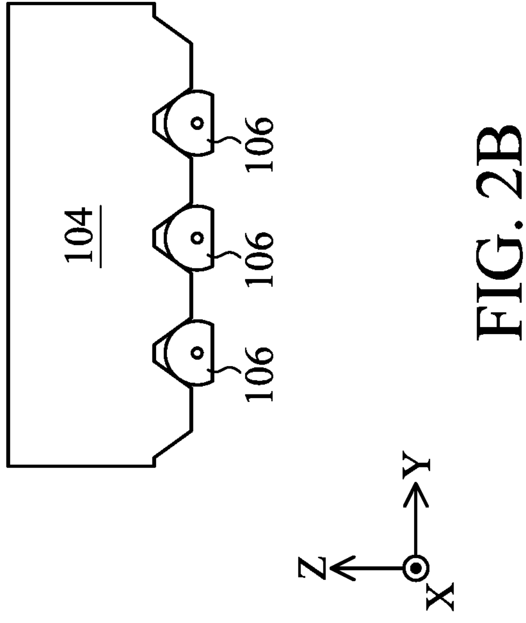
FIGS. 2A and 2B illustrate cross-sectional views of FAUs of the integrated FAU structure in FIG. 1, in accordance with some embodiments.
Figure 2A:
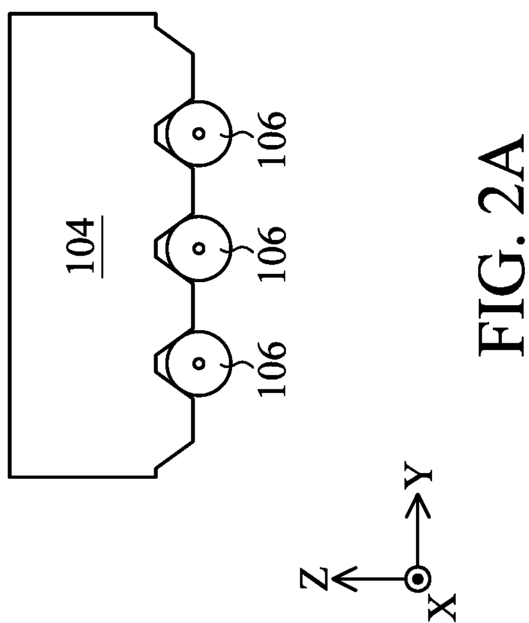

FIG. 1 illustrates a cross-sectional view of an integrated FAU structure 100, in accordance with some embodiments. The integrated FAU structure 100 (hereinafter referred to as the FAU structure) may be used to optically couple optical fibers 106 to optical couplers (e.g., grating couplers or edge couplers) within a photonic die of a photonic package 620 (e.g., see FIG. 26), which will be described in greater detail below. As shown in FIG. 1, the FAU structure 100 consists of three parts: a FAU 102 that holds multiple optical fibers 106, a light guide structure 110, and a carrier board 130. During assembly, the FAU 102 and light guide structure 110 are connected using optical glue 128, and they are further connected to the carrier board 130 using optical glue 132. The FAU 102 includes a fiber holder 104 used to hold optical fibers 106. FIGS. 2A and 2B illustrate cross-sectional views of fiber holders 104 holding optical fibers 106, in accordance with some embodiments. As shown in FIGS. 2A and 2B, a fiber holder 104 may have multiple grooves (e.g., recesses) formed on its lower surface, with an optical fiber 106 held within each groove. The grooves shown in FIGS. 2A and 2B are merely examples, and a fiber holder 104 may have a different number of grooves (corresponding to the number of optical fibers 106 held) than shown, or the grooves may have a different shape or different dimensions than shown. The fiber holder 104 may be formed of one or more materials such as silicon (e.g., bulk silicon), silicon oxide, ceramic, glass, polymer, metal, metal alloy, the like, or a combination thereof. In some cases, the end of each optical fiber 106 remote from the fiber holder 104 may be coupled to an optical interconnect (e.g., an MT ferrule, not shown) that couples to a light source (not shown). In some embodiments, the optical fibers 106 may be secured in the corresponding grooves of the fiber holder 104 using a glue (not shown), which may be an adhesive, an optical glue, or the like.

In some embodiments, a polishing process may be performed to remove bottom portions of the optical fibers 106, as shown in FIG. 2B. The polishing process may comprise a chemical-mechanical polishing (CMP) process, a grinding process, or another suitable polishing process. In some embodiments, after performing the polishing process, bottom surfaces of the optical fibers 106 are substantially flat and coplanar. In this manner, polishing the optical fibers 106 may reduce the overall height of the optical fibers 106 and the FAU 102.

In some embodiments, the FAU 102 may be oriented within the FAU structure 100 such that the optical fibers 106 are proximal to a reflective layer 112 within the light guide structure 110, as shown in FIG. 1. This allows light beams provided by the optical fibers 106 to be reflected (e.g., redirected) by corresponding reflectors 114 within the reflective layer 112 toward the photonic package 620 (e.g., see FIG. 26), as indicated by optical path S (depicted by a dashed line with an arrow) in FIG. 1.

The light guide structure 110 (also called a passive optical component structure 110) includes a mirror layer or reflective layer 112, a lens layer 118, and a glass cover 126, in accordance with some embodiments. As shown in FIG. 1, the glass cover 126, the reflective layer 112 and the lens layer 118 are arranged in sequence along the vertical direction (e.g., the Z-direction), with the glass cover 126 at the top, the lens layer 118 at the bottom, and the reflective layer 112 between the glass cover 126 and the lens layer 118. In this manner, the glass cover 126 provides protection for the underlying reflective layer 112 and lens layer 118.

In some embodiments, the reflective layer 112 includes multiple reflectors 114 embedded in one or more dielectric layers 116. The reflectors 114 may be a single-layered metal or a multi-layered structure including multiple sub-layers, which will be described in greater detail below. As mentioned above, the reflectors 114 may be formed to redirect light from the optical fibers 106 of the FAU 102. For example, each reflector 114 may forms an angle θ with a horizontal plane (e.g., the X-Y plane) (in the case where the optical fibers 106 are arranged horizontally) such that the direction of travel of light from the optical fibers 106 may change from horizontal to vertical and downward (i.e., toward the lens layer 118), as indicated by optical path S in FIG. 1. The angle θ may be about 45 degrees in some embodiments, although other degrees may be used. In a plan view (not specially illustrated), the reflectors 114 may be aligned with the optical fibers 106 in a one-to-one fashion (e.g., one reflector 114 and one corresponding optical fiber 106 are arranged on a line along the X-direction).

Note that the reflective layer 112 embedding the reflectors 114 is in contrast to a reflective layer where the reflectors are formed and exposed on the end face of the reflective layer. Embedding the reflectors 114 within the reflective layer 112 (e.g., dielectric layer 116) can reduce the risk of damage to the reflectors 114 during assembly of the FAU structure 100 and the photonic package 620 (e.g., see FIG. 26).

In some embodiments, the lens layer 118 is made of silicon and is therefore also called a silicon lens layer 118. The silicon lens layer 118 includes multiple silicon lenses 120 located adjacent to the reflectors 114 (due to viewing angle limitations, one silicon lens 120 and one corresponding reflector 114 are shown in FIG. 1) to allow reflected light from the reflectors 114 to pass through the corresponding silicon lenses 120. The silicon lenses 120 helps focus the light beams, thereby adjusting the spot size.

In some embodiments, the silicon lens layer 118 also includes multiple silicon pillars (or walls) 122, as shown in FIG. 1. Silicon pillars 122 may be evenly distributed throughout the lens layer 118, which helps avoid stress concentration issues in the lens layer 118. Gaps 123 (not shown in FIG. 1, but illustrated in FIG. 8) formed between the silicon pillars 122 allow light (e.g., UV light) to pass through to cure the optical glue 636 (e.g., see FIG. 26) for attaching the FAU structure 100 to the photonic package 620 during the UV curing process. In some cases, the gap size G between adjacent silicon pillars 122 is in a range between about 200 μm and about 1000 μm, although smaller or larger gap size may be used. In some embodiments, a dielectric material 124 (also referred to as a gap-filling material 124) is formed to fill the gaps 123 between the silicon pillars 122.

Figure 26:
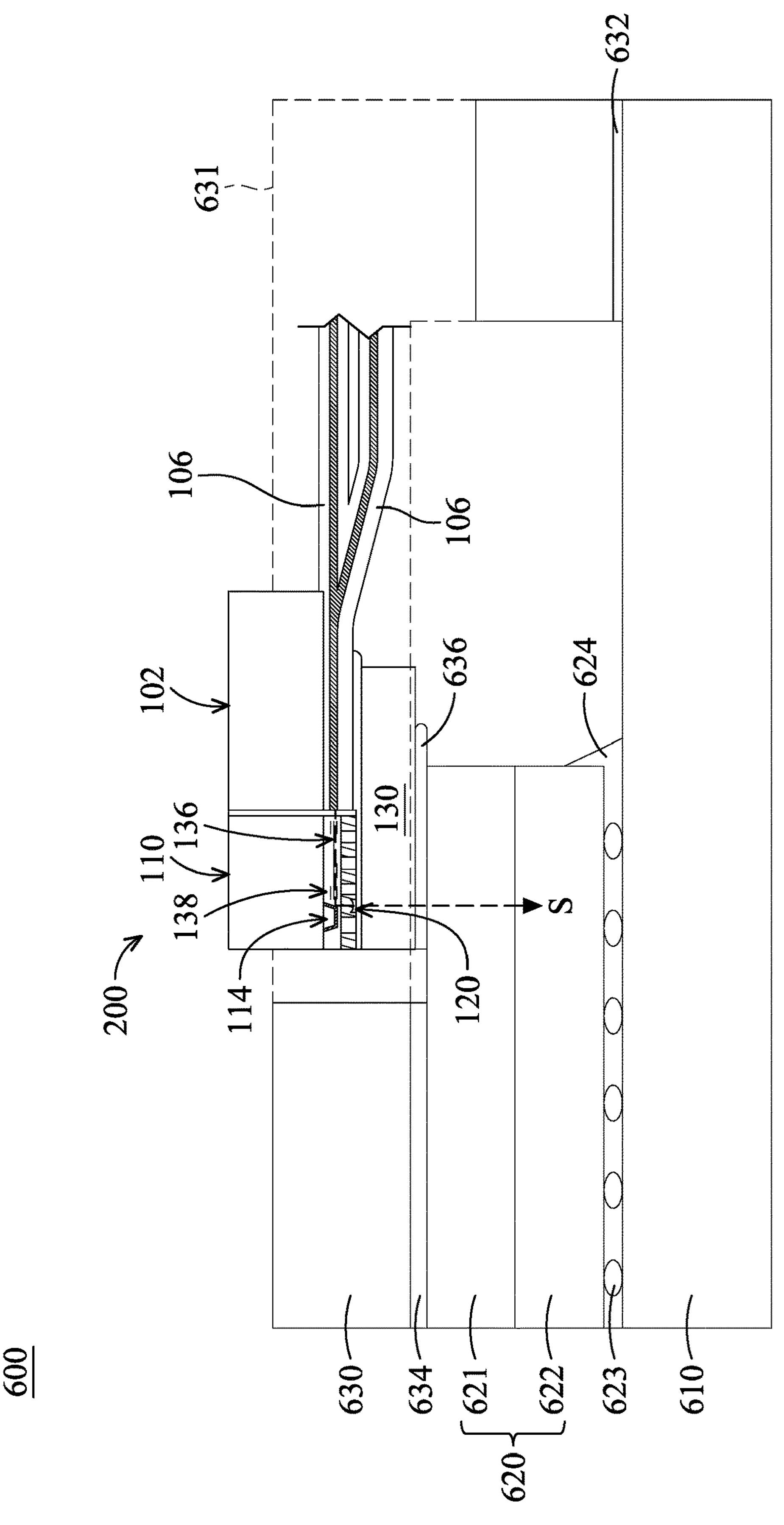
FIG. 26 illustrates a cross-sectional view of a portion of a semiconductor package, in accordance with some embodiments.

The carrier board 130 is used to mechanically support the FAU 102 and light guide structure 110 and allows the FAU structure 100 to be attached to the photonic package 620 through, e.g., optical glue 636 (e.g., see FIG. 26). The carrier board 130 may comprise a material that is substantially transparent to light at wavelengths suitable for transmitting optical signals or signal power between the optical couplers within the photonic package 620 (e.g., see FIG. 26) and the optical fibers 106. In some embodiments, the carrier board 130 comprises a UV-transparent material (e.g., glass or sapphire) to allow UV light to pass through during the UV curing process of the optical glue 636. In some cases, the thickness T1 of the carrier board 130 is in a range between about 200 μm and about 500 μm, although other thicknesses may be used.

Figure 3:
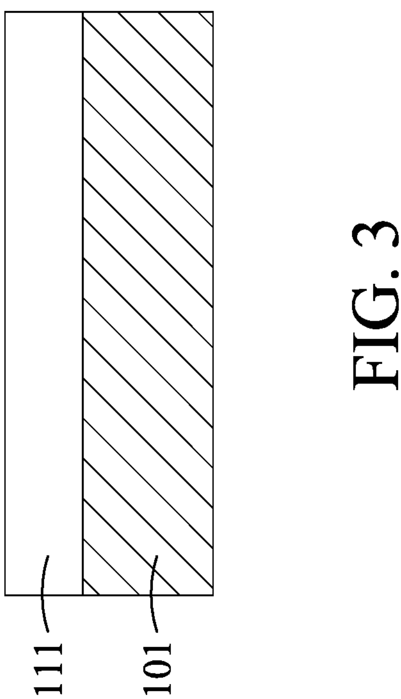
FIGS. 3 to 11 illustrate cross-sectional views of intermediate steps of forming the integrated FAU structure in FIG. 1, in accordance with some embodiments.

FIGS. 3 to 11 illustrate cross-sectional views of intermediate steps of forming the integrated FAU structure 100 in FIG. 1, in accordance with some embodiments. In FIG. 3, a silicon substrate 101 is provided. In the present embodiment, the silicon substrate 101 is a silicon wafer including multiple component areas separated by scribe lines 127 (e.g., see FIG. 9). A dielectric material 111 is formed over the silicon substrate 101. In some embodiments, the dielectric material 111 is formed of a dielectric material (e.g., silicon oxide or silicon nitride) that is substantially transparent to light at wavelengths suitable for transmitting optical signals. The dielectric material 111 may be formed by any acceptable deposition process, such as chemical vapor deposition (CVD), physical vapor deposition (PVD), atomic layer deposition (ALD), spin coating, laminating, the like, or a combination thereof. Other suitable dielectric materials formed by any acceptable process may be used.

Figure 4:
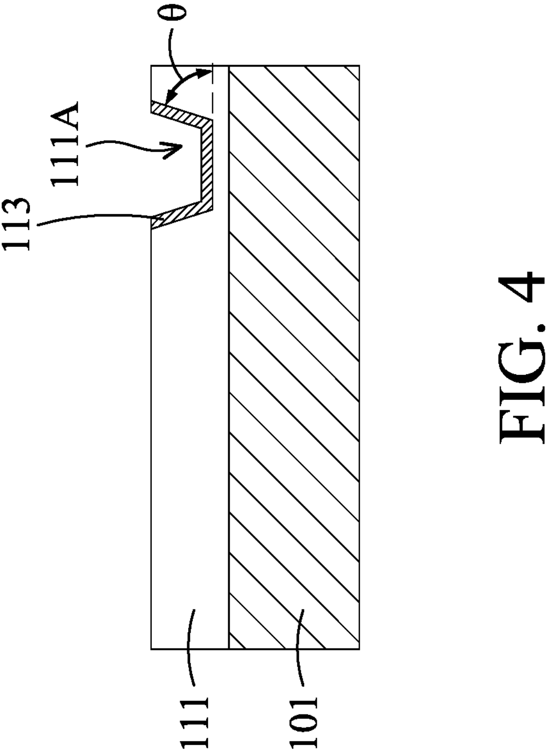

Next in FIG. 4, openings 111A are formed in the dielectric material 111 at locations where the reflectors 114 (e.g., see FIG. 5) are to be formed. The openings 111A may extend to a depth of the dielectric material 111 or directly through the dielectric material 111. The sidewall of each opening 111A may form an angle θ with a horizontal plane (depicted by dashed line), so that the subsequently formed reflector 114 also forms the angle θ with the horizontal plane. The angle θ may be about 45 degrees in some cases, although other degrees may be used. The openings 111A may be formed by acceptable photolithography and etching techniques, such as by forming and patterning a photoresist and then performing an etching process using the patterned photoresist as an etching mask. The etching process may include, for example, an anisotropic wet etching process. Other suitable processes for forming the openings 111A may be used.

Still referring to FIG. 4, a reflective coating 113 is conformally formed on the sidewalls and bottom of each opening 111A. In some embodiments, the reflective coating 113 is a single-layered metal, where the metal material used includes gold (Au), silver (Ag), copper (Cu), aluminum (Al), titanium (Ti), tantalum (Ta), the like, the alloy thereof, or a combination thereof. Alternatively, the reflective coating 113 is a multi-layered structure including multiple sub-layers, where each sub-layer may be formed from the above metal materials or other suitable dielectric materials (e.g., silicon oxide ($SiO_2$), hafnium oxide ($HfO_2$), tantalum oxide ($Ta_2O_5$), titanium oxide ($TiO_2$), silicon nitride (SiN), amorphous silicon, etc.). The reflective coating 113 may be formed using any acceptable process, such as CVD, PVD, ALD, or another suitable deposition process. In some cases, the thickness of the reflective coating 113 may be in a range between about 100 Å and about 100 μm, although other thicknesses may be used.

In some embodiments, a mask layer (not shown) may be formed on the upper surface of the dielectric material 111 to prevent the reflective coating 113 from being formed on the upper surface, while exposing the openings 111A so that the reflective coating 113 may be formed only on the surfaces of each opening 111A. After the reflective coating 113 is formed, the mask layer can be removed using a suitable removal process.

Figure 5:
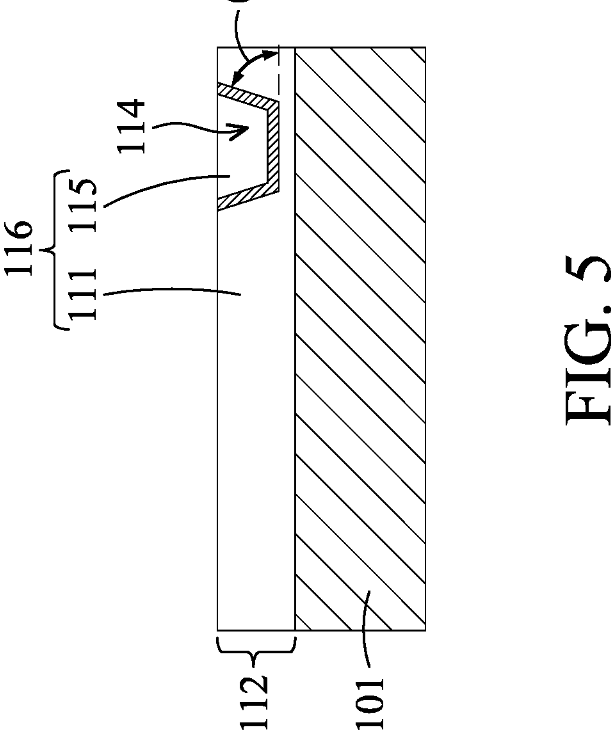

Next in FIG. 5, a dielectric material 115 is formed over dielectric material 111 and the reflective coating 113 in the openings 111A. The material and formation method of the dielectric material 115 may be similar or the same as those of the dielectric material 111 described previously. A planarization process (e.g., CMP process, grinding process or the like, not shown) may be performed on the dielectric layer 115 to thin and planarize the dielectric material 115. In some embodiments, after performing the planarization process, the top surfaces of the dielectric materials 111 and 115 may be substantially level or coplanar, as shown in FIG. 5. Alternatively, a portion of the dielectric material 115 may remain on the dielectric material 111 after the planarization process. The reflective coating 113 embedded in the dielectric materials 111 and 115 (collectively referred to as the dielectric layers 116) forms the reflectors 114. Accordingly, a reflective layer 112 including embedded reflectors 114 is formed over the silicon substrate 101.

Figure 6:
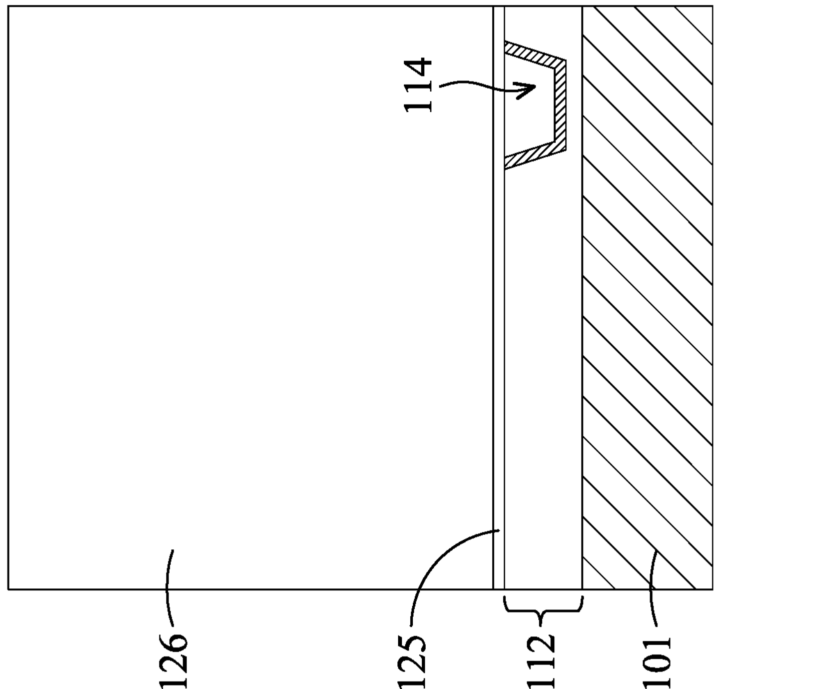

Next in FIG. 6, a glass cover 126 is bonded to the side of the reflective layer 112 opposite the silicon substrate 101. The glass cover 126 may be bonded to the reflective layer 112 through a bonding layer 125. The bonding layer 125 may comprise a material suitable for dielectric-to-dielectric bonding, in some cases. For example, the bonding layer 125 may be formed of or comprise a dielectric material, such as silicon oxide ($SiO_2$), SiN, SiON, SiOCN, SiC, SiCN, the like, or a combination thereof, and may be formed over the glass cover 126 or the reflective layer 112 using high-density plasma chemical vapor deposition (HDPCVD), plasma enhanced chemical vapor deposition (PECVD), CVD, low-pressure chemical vapor deposition (LPCVD), ALD, or the like. Other suitable dielectric or bonding materials formed by any acceptable process may be used.

Figure 7:
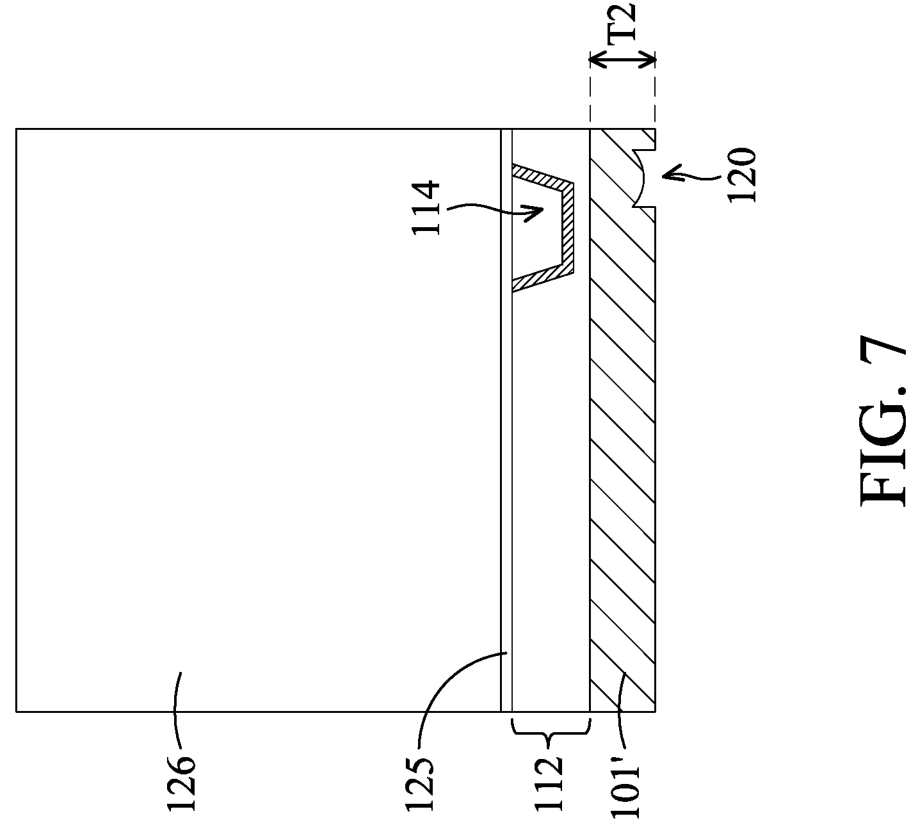

Next in FIG. 7, the silicon substrate 101 is thinned using a thinning process (e.g., a CMP process, a grinding process, an etching process, or another suitable process). The thinned silicon substrate 101' may have a thickness T2 (e.g., about 30 μm to about 70 μm) such that reflected light from the reflectors 114 can successfully pass through it (i.e., to avoid or reduce light reflection). In some cases, thinning the silicon substrate allows the bottom surface of the light guide structure 110 (e.g., the bottom surface of the lens layer 118) and the bottom surface of the FAU 102 (e.g., the bottom surface of the optical fibers 106) to be substantially level or coplanar after the light guide structure 110 and the FAU 102 are connected (e.g., see FIG. 10), although the disclosure is not limited thereto.

Still referring to FIG. 7, lens structures 120 are then formed on (e.g., recessed from) the bottom surface of the thinned silicon substrate 101', which may also be referred to as silicon lenses 120. The silicon lenses 120 may be located near the reflectors 114 such that reflected light from one reflector 114 may pass through the corresponding silicon lens 120 as described above. The silicon lenses 120 may be formed using acceptable photolithography and etching techniques. For example, a hard mask layer (e.g., a nitride layer or the like, not shown) may be formed over the bottom surface of the thinned silicon substrate 101' and patterned, with the pattern of the hard mask layer corresponding to the silicon lenses 120, in some embodiments. An etching process may then be performed on the thinned silicon substrate 101' using the patterned hard mask layer as an etching mask to form the silicon lenses 120. The etching processes may be a dry etching process or a wet etching process, which may include an isotropic process. In some embodiments, more than one photolithography and etching process may be used in order to form the silicon lenses 120. After the formation of the silicon lenses 120, the hard mask layer may be removed from the thinned silicon substrate 101' using an ashing process or another acceptable etching process.

Figure 8:
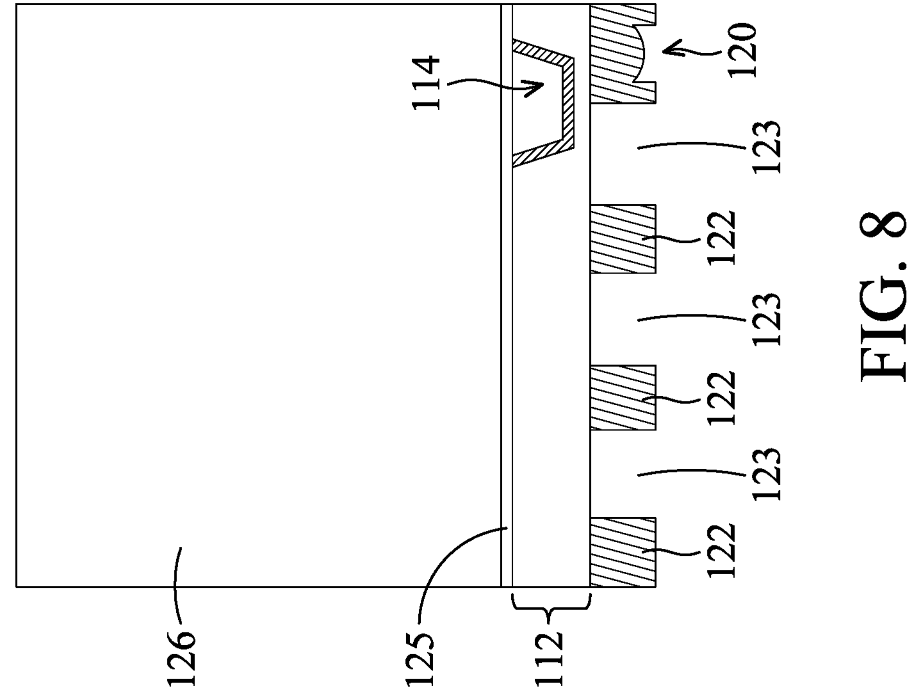

Next in FIG. 8, silicon pillars 122 are evenly formed in areas of the thinned silicon substrate 101' other than the silicon lenses 120, with gaps 123 between them. The silicon pillars 122 and gaps 123 may be formed using acceptable photolithography and etching techniques. For example, a photoresist layer (not shown) may be formed over the bottom surface of the thinned silicon substrate 101' and patterned, with the pattern of the photoresist layer corresponding to the gaps 123, in some embodiments. An etching process may then be performed on the thinned silicon substrate 101' using the patterned photoresist layer as an etching mask to form the gaps 123. The etching process may include, for example, an isotropic dry etching process. Other suitable processes for forming the gaps 123 may be used. After the gaps 123 are formed, the photoresist layer can be removed using a suitable removal process. Remaining portions of the thinned silicon substrate 101' form the silicon pillars 122.

Figure 9:
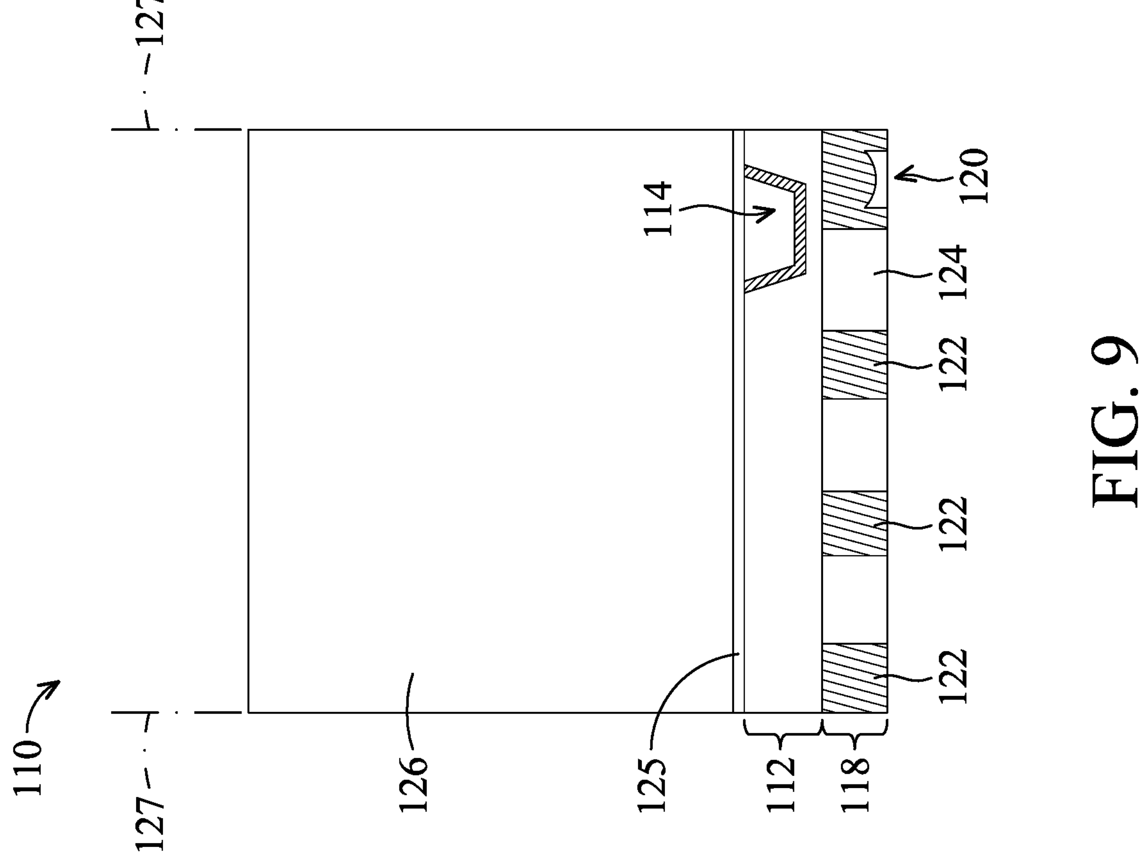

Next in FIG. 9, a dielectric material 124 (also referred to as a gap-filling material 124)) is deposited over the bottom surface of the thinned silicon substrate 101' and fills the gaps 123 between the silicon pillars 122 (and also fills the gap over the lens surface of the silicon lenses 120). The dielectric material 124 may be formed of silicon oxide, silicon nitride, a polymer, the like, or a combination thereof, and may be formed by CVD, PVD, ALD, or another suitable deposition process. Other suitable dielectric materials formed by any acceptable process may be used. The dielectric material 124 may be planarized using a planarization process such as a CMP process, a grinding process, or the like. In some embodiments, after performing the planarization process, the bottom surfaces of the silicon pillars 122 and the dielectric material 124 may be substantially level or coplanar. Accordingly, a lens layer 118 including silicon lenses 120 and silicon pillars 122 is formed below the reflective layer 112.

Still referring to FIG. 9, a singulation process is then performed to separate the light guide structures 110 formed on the same silicon substrate 101 (e.g., silicon wafer) into individual light guide structures 110 (for simplicity, only one light guide structure 110 is shown). The singulation process may include sawing through the scribe lines 127 using a mechanical saw, in some embodiments. Other suitable singulation processes may be used. In some embodiments, after singulation, the reflectors 114 are embedded within the reflective layer 112 (i.e., not exposed form the sidewalls of the reflective layer 112) so that they can be protected. The silicon lenses 120 may also be protected by the dielectric material 124 and are not exposed. In this manner, the risk of damage to the passive optical components (e.g., including the reflectors 114 and silicon lenses 120) of the light guide structure 110 during subsequent assembly steps may be reduced.

Figure 10:
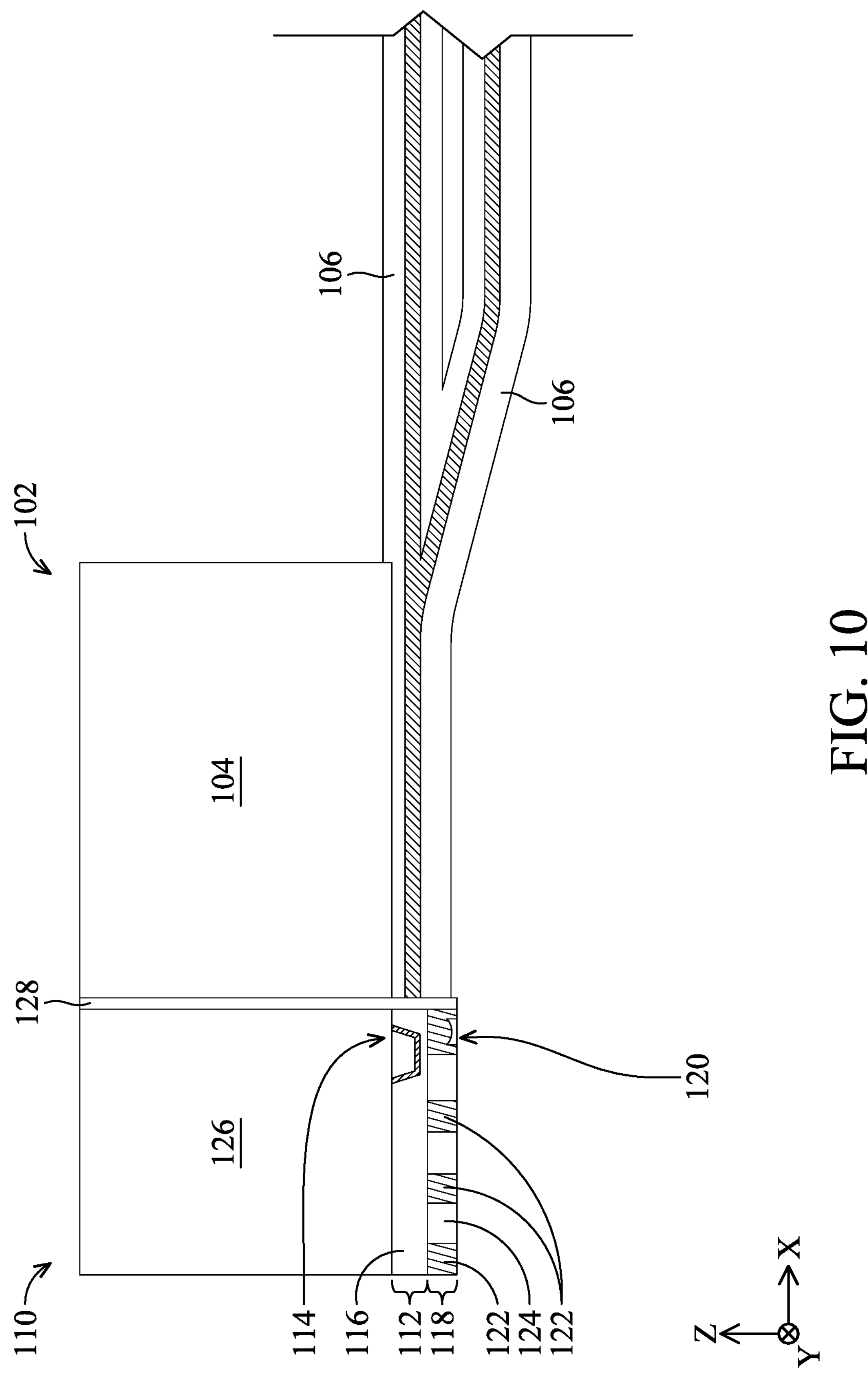

Next in FIG. 10, after the formation of the light guide structure 110, the FAU 102 and the light guide structure 110 are connected using optical glue 128. An alignment process, which laterally and vertically aligns the optical fibers 106 of the FAU 102 and the reflectors 114 of the light guide structure 110, may be performed prior to connecting the FAU 102 and the light guide structure 110, in accordance with some embodiments. After performing the alignment process, the optical glue 128 is dispensed into the gap between the sidewalls of the FAU 102 and the light guide structure 110. The optical glue 128 may further extend into the gap between the optical fibers 106 and the reflective layer 112 to improve the optical coupling between the optical fibers 106 and the reflective layer 112 (e.g., the reflectors 114). The optical glue 128 may be applied in liquid form and then subsequently cured (e.g., by UV curing).

Figure 11:
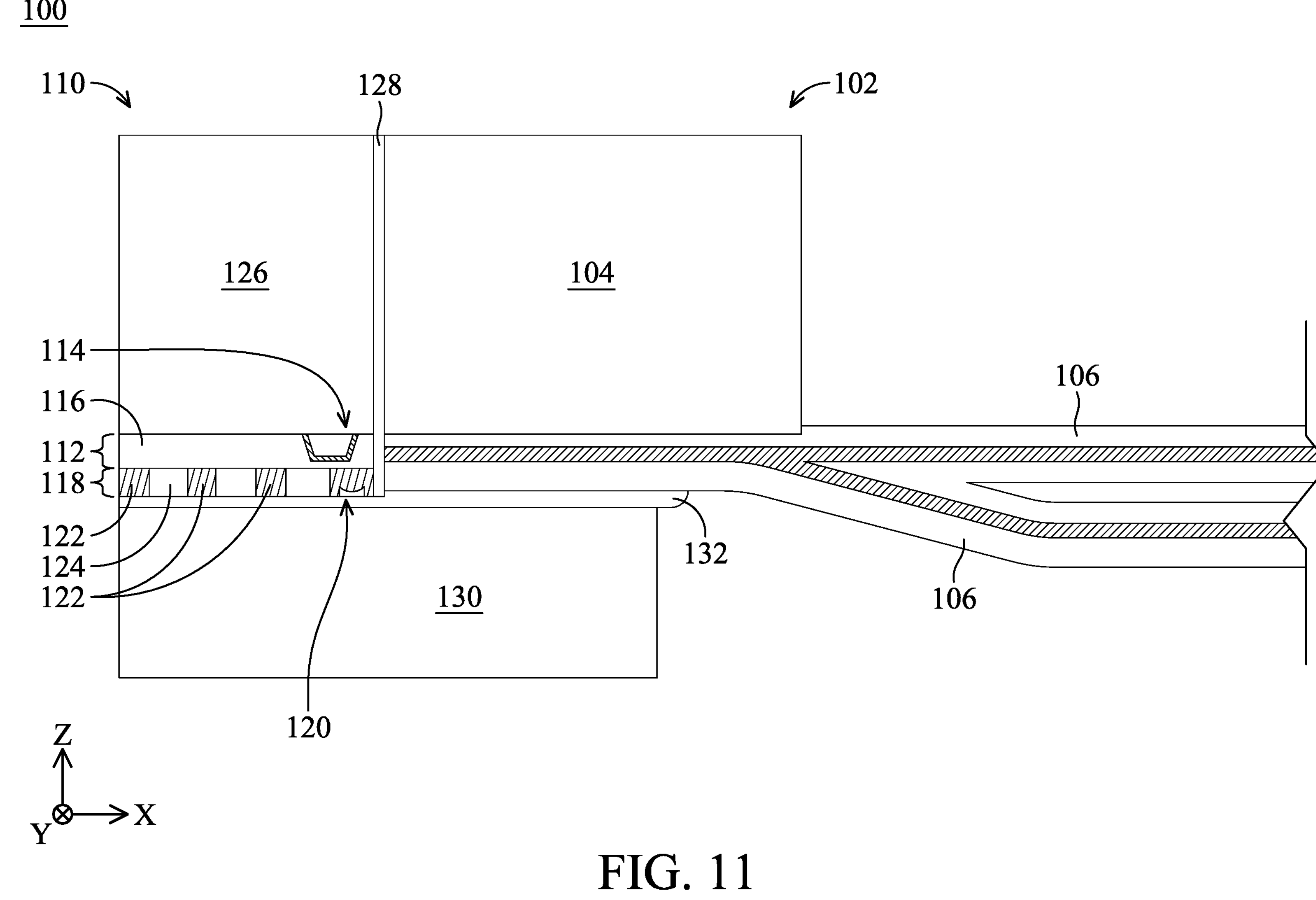

Next in FIG. 11, the resulting structure of FIG. 10 is connected to a carrier board 130 using optical glue 132 to form the integrated FAU structure 100 previously described with reference to FIG. 1. The carrier board 130 may act as a flat interface for the FAU structure 100 to connect the photonic package 620 (e.g., see FIG. 26), which helps improve the physical and optical coupling between the FAU structure 100 and the photonic package 620. Similarly, the optical glue 132 may be dispensed in liquid form and then subsequently cured (e.g., by UV curing).

It should be understood that since the integrated FAU structure 100 of the above embodiments integrates the FAU 102 and passive optical components (e.g., the reflectors 114 and silicon lenses 120), its optical performance is improved. Furthermore, this eliminates the need for additional passive optical components outside of the FAU structure, thus reducing the area occupied by these optical components within the semiconductor package 600 (e.g., see FIG. 26). As a result, the package size of the semiconductor package 600 can be reduced.

Figure 12:
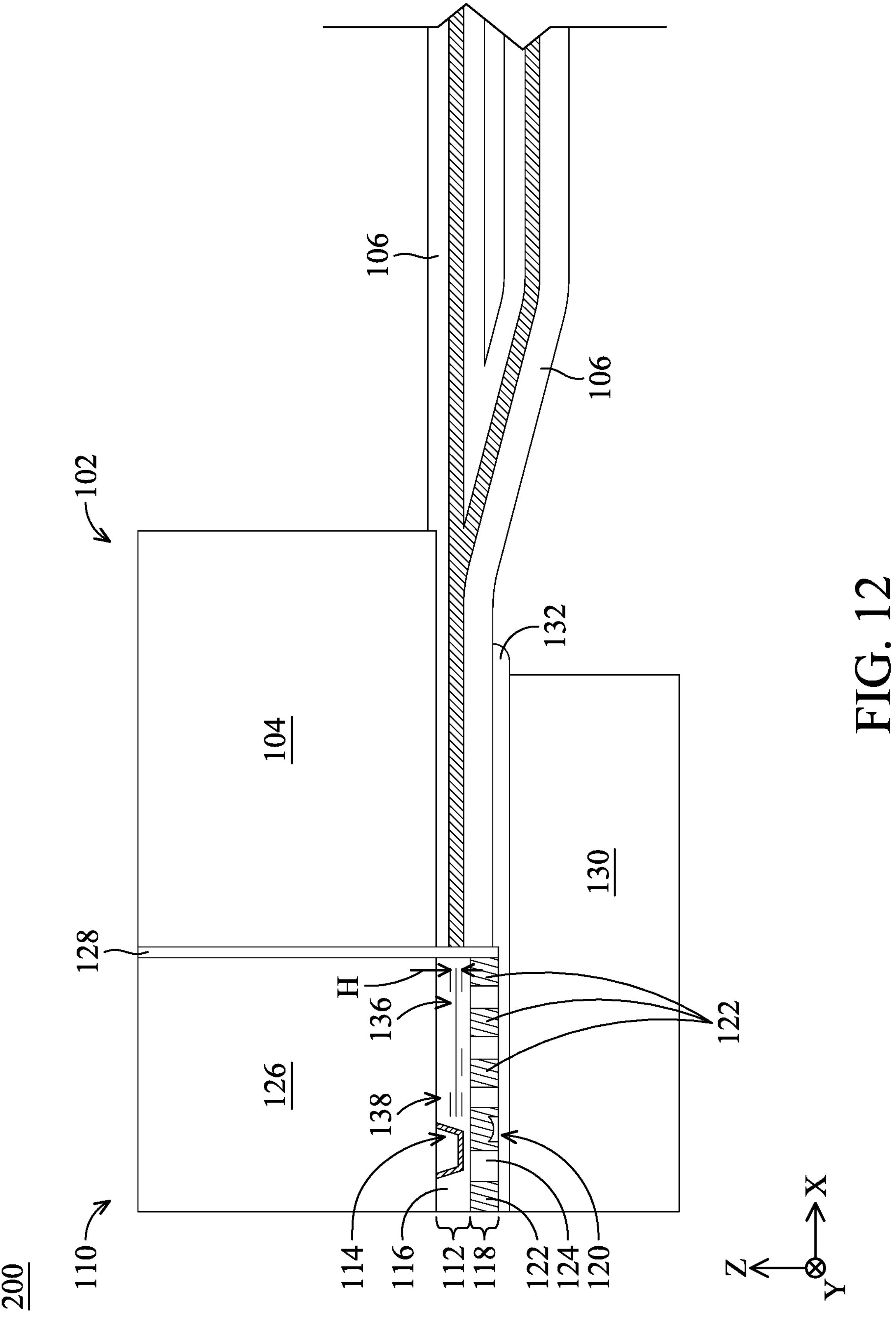
FIG. 12 illustrates a cross-sectional view of an integrated FAU structure, in accordance with some embodiments.

In other embodiments, various other optical passive components may be embedded within the reflective layer 112 to improve the optical performance of the integrated FAU structure. For example, FIG. 12 illustrates a cross-sectional view of an integrated FAU structure 200, in accordance with some embodiments. The integrated FAU structure 200 is similar to the integrated FAU structure 100 of FIGS. 1 to 11, except that waveguides 136 and beam splitters 138 are further embedded within the reflective layer 112. As shown in FIG. 12, as the waveguides 136 and beam splitters 138 are inserted into the reflective layer 112, the positions of the reflectors 114 and the silicon lens 120 may also change. It should be understood that the positions of the waveguides 136, reflectors 114 and silicon lens 120 are determined by the positions of the optical couplers within the photonic package 620 (e.g., see FIG. 26).

The waveguides 136 are laterally located between the reflectors 114 and the optical fibers 106 of the FAU 102 to help guide light. For example, in a plan view (not specially illustrated), the waveguides 136 are elongated and parallel to each other, and the waveguides 136 may be aligned with the reflectors 114 in a one-to-one fashion (e.g., one waveguide 136 and one corresponding reflector 114 are arranged on a line along the X-direction) and may be aligned with the optical fibers 106 in a one-to-one fashion (e.g., one waveguide 136 and one corresponding optical fiber 106 are arranged on a line along the X-direction). The waveguides 136 are also positioned such that the fiber core of each optical fiber 106 is aligned with the corresponding waveguide 136 (i.e., they are at the same vertical height) in the cross-sectional view (e.g., see FIG. 12) to allow optical coupling between the optical gibers 106 and the respective waveguides 136.

In some embodiments, each waveguide 136 may have a larger dimension (e.g., height H, shown in FIG. 12) at its end adjacent the corresponding optical fiber 106 to match the size (e.g., diameter) of the fiber core, thereby increasing the efficiency of optical coupling between the optical gibers 106 and the respective waveguides 136. The height H of the waveguide 136 may be increased by increasing the number of layers and/or thickness of the waveguide 136.

Due to the difference in refractive indices of the materials of the waveguides 136 and the surrounding dielectric layer 116, the waveguides 136 have high internal reflections so that light is substantially confined within the waveguides 136, depending on the wavelength of the light and the refractive indices of the respective materials. In some embodiments, the refractive index of the material of the waveguides 136 is higher than the refractive index of the material of the dielectric layers 116. For example, the waveguides 136 may comprise silicon nitride, and the dielectric layers 116 may comprise silicon oxide. However, other materials suitable for the waveguides 136 and dielectric layers 116 may be used.

The waveguides 136 may be formed by any acceptable deposition process, such as spin coating, CVD, laminating, the like, or a combination thereof. In some embodiments, the waveguides 136 are nitride (e.g., silicon nitride) waveguides formed by patterning a silicon nitride layer using acceptable lithography and etching processes. Note that silicon nitride has a higher dielectric constant than silicon, and therefore a nitride waveguide may have a greater internal confinement of light than a silicon waveguide. This may also allow the performance or leakage of nitride waveguides to be less sensitive to process variations, less sensitive to dimensional uniformity, and less sensitive to surface roughness (e.g., edge roughness or linewidth roughness). Further details of the waveguides 136 are not described here.

The beam splitters 138 may be integrated with the waveguides 136, and may be formed with the waveguides 136 (e.g., they may share some of the same structure and process steps). The beam splitters 138 may be optically coupled with the waveguides 136 and may interact with optical signals within the waveguides 136. In the present embodiments, each beam splitter 138 is, for example, a Polarization Beam Splitter (PBS), and can pass a light beam having a specific Polarization direction and reflect a light beam having another specific Polarization direction. For example, the polarization beam splitter 138 may involve passing P-polarized light and reflecting S-polarized light, but it is not limited thereto. In this manner, the light beams from the optical fibers 106 can be converted into a specific Polarization direction through the polarization beam splitters 138 before reaching the reflectors 114. Other structures, configurations or arrangements of the waveguides 136 and/or the beam splitters 138 are also possible, and are not limited to those shown in FIG. 12. Further details of the beam splitters 138 are not described here. In other embodiments, the beam splitters 138 may be omitted.

Figure 13:
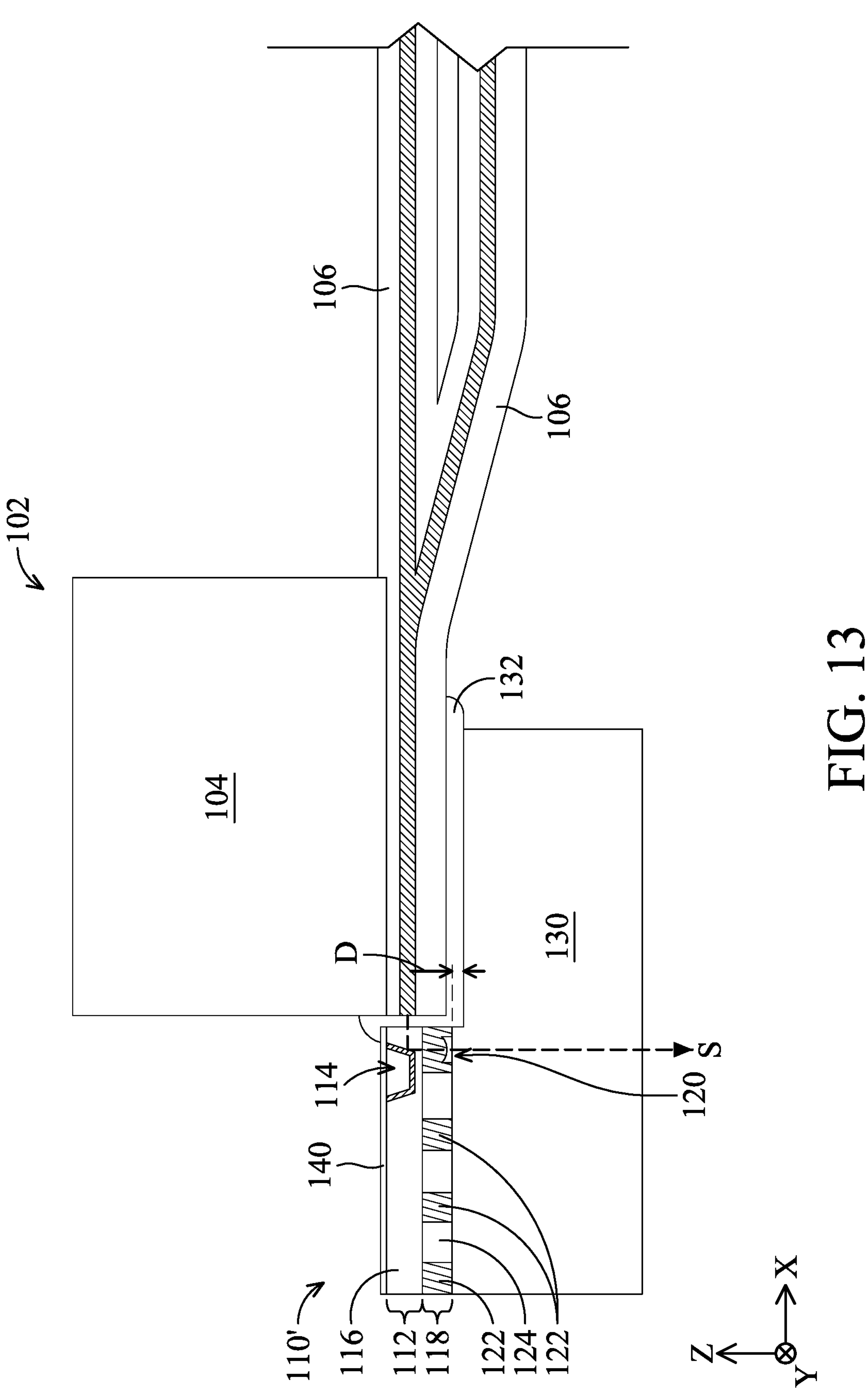
FIG. 13 illustrates a cross-sectional view of an integrated FAU structure, in accordance with some embodiments.

FIG. 13 illustrates a cross-sectional view of an integrated FAU structure 300, in accordance with some embodiments. The integrated FAU structure 300 is similar to the integrated FAU structure 100 of FIGS. 1 to 11, except that the light guide structure 110 is replaced by a light guide structure 110'. In the light guide structure 110' of the present embodiment, there is no glass cover 126, but a protection material 140 (also referred to as a passivation layer 140) is formed above the reflective layer 112 for protection. Furthermore, the light guide structure 110' is directly bonded to the carrier board 130. In this manner, the step of assembling the light guide structure 110' and the FAU 102 and the amount of optical glue can be reduced (e.g., the optical glue 128 for connecting the light guide structure 110 and the FAU 102 in the embodiments of FIGS. 1-11 can be omitted).

Additionally, in the example of FIG. 13, the optical glue 132 used to connect the FAU 102 to the carrier board 130 may extend into the gap between the sidewalls of the light guide structure 110' and the FAU 102 to improve the optical coupling between the optical fibers 106 and the reflective layer 112 (e.g., the reflectors 114). In some cases, the optical glue 132 may also extend onto the top surface of the protection material 140, which helps enhance adhesion between the protection material 140 and the reflective layer 112.

In some embodiments, a recess 146 (not shown in FIG. 13, but illustrated in FIG. 18) is formed on the top surface of the carrier board 130 to accommodate the optical fibers 106. This facilitates reducing the height of the FAU structure 300. In some cases, the depth D of the recess 146 may be in a range between 0 μm and about 50 μm, depending on the diameter of the optical fibers 106 (e.g., the larger the diameter of the optical fibers 106, the larger the depth D of the recess). Other depths of the recess 146 may be used.

Figure 14:
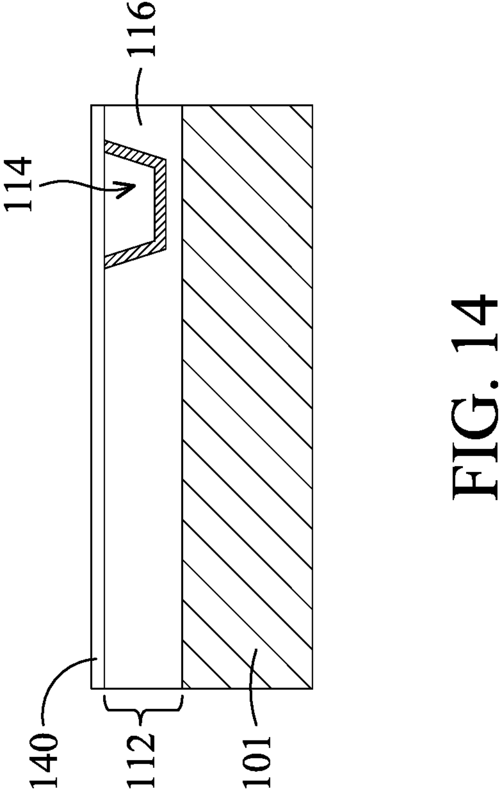
FIGS. 14 to 19 illustrate cross-sectional views of intermediate steps of forming the integrated FAU structure in FIG. 13, in accordance with some embodiments.

FIGS. 14 to 19 illustrate cross-sectional views of intermediate steps of forming the integrated FAU structure 300 in FIG. 13, in accordance with some embodiments. In FIG. 14, a structure similar to that shown in FIG. 5 is obtained, and then a protection material 140 is formed over the reflective layer 112. The protection material 140 may comprise one or more materials similar to those described above for the dielectric layers 116, such as a silicon oxide or a silicon nitride, or may comprise a different material. In some embodiments, the protection material 140 is denser than the dielectric layers 116, and has the function of isolating the optical components (e.g., reflectors 114) within the dielectric layers 116 from detrimental chemicals and gases such as moisture in external environment. In such embodiments, the protection material 140 may be undoped silicate-glass (USG), tetraethoxysilane (TEOS) oxide, or another suitable protection material.

Figure 15:
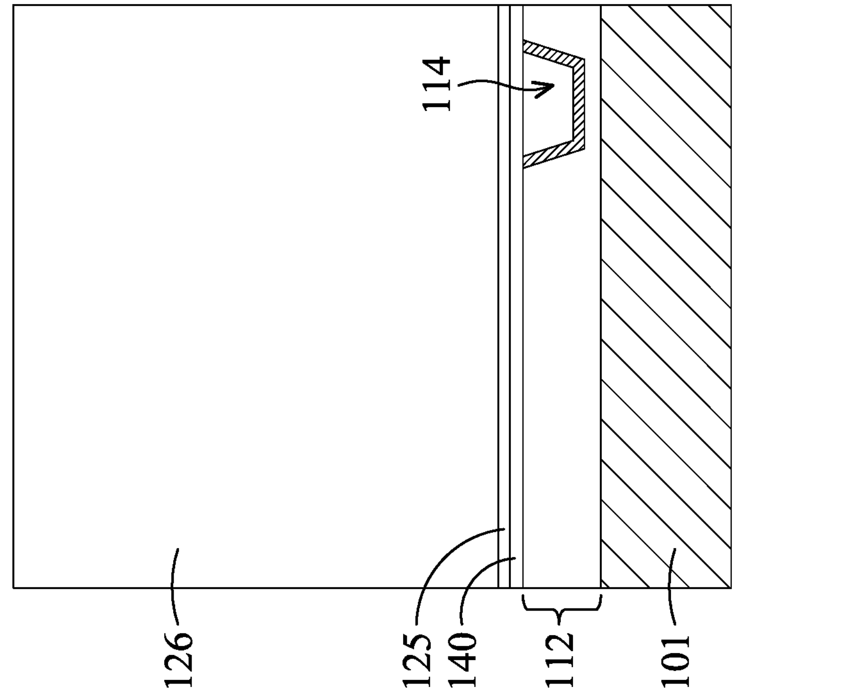

Next in FIG. 15, a temporary glass carrier such as the previously described glass cover 126 is bonded to the protection material 140 above the reflective layer 112. The glass cover 126 may be bonded to the protection material 140 through a bonding layer such the bonding layer 125 described above. The materials and formation method of the bonding layer 125 can refer to the content described in FIG. 6.

Next in FIG. 16, a lens layer 118 including silicon lenses 120 and silicon pillars 122 is formed below the reflective layer 112. The lens layer 118 may be formed by thinning the silicon substrate 101, forming silicon lenses 120 on the bottom surface of the thinned silicon substrate 101', forming silicon pillars 122 in areas of the thinned silicon substrate 101' other than the silicon lenses 120, and filling the gaps between the silicon pillars 122 with a dielectric material 124, as described above with reference to FIGS. 7 to 9. Therefore, details regarding the lens layer 118 are not repeated here.

Figure 16:
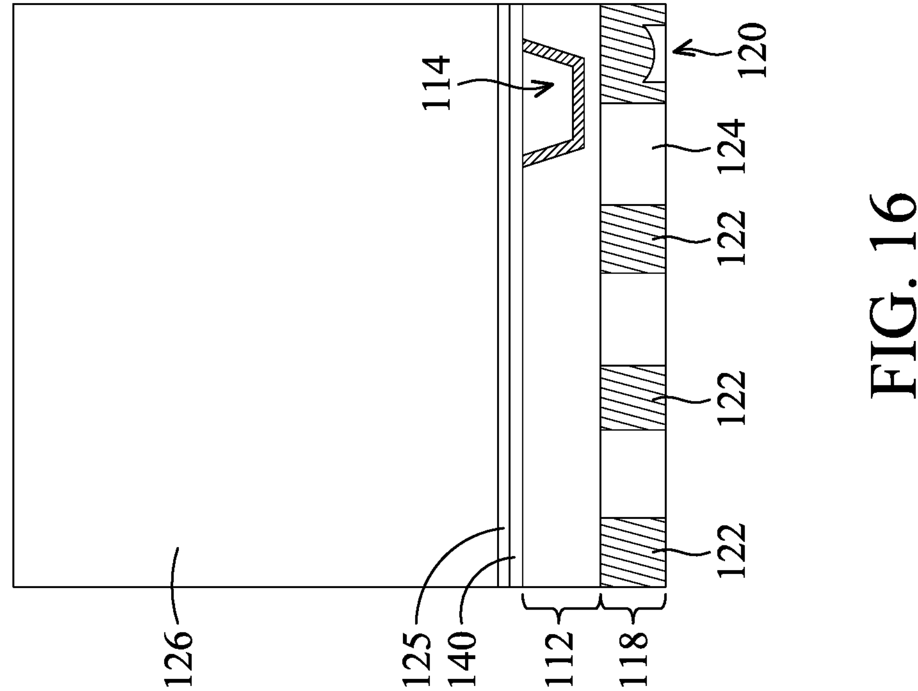
Figure 17:
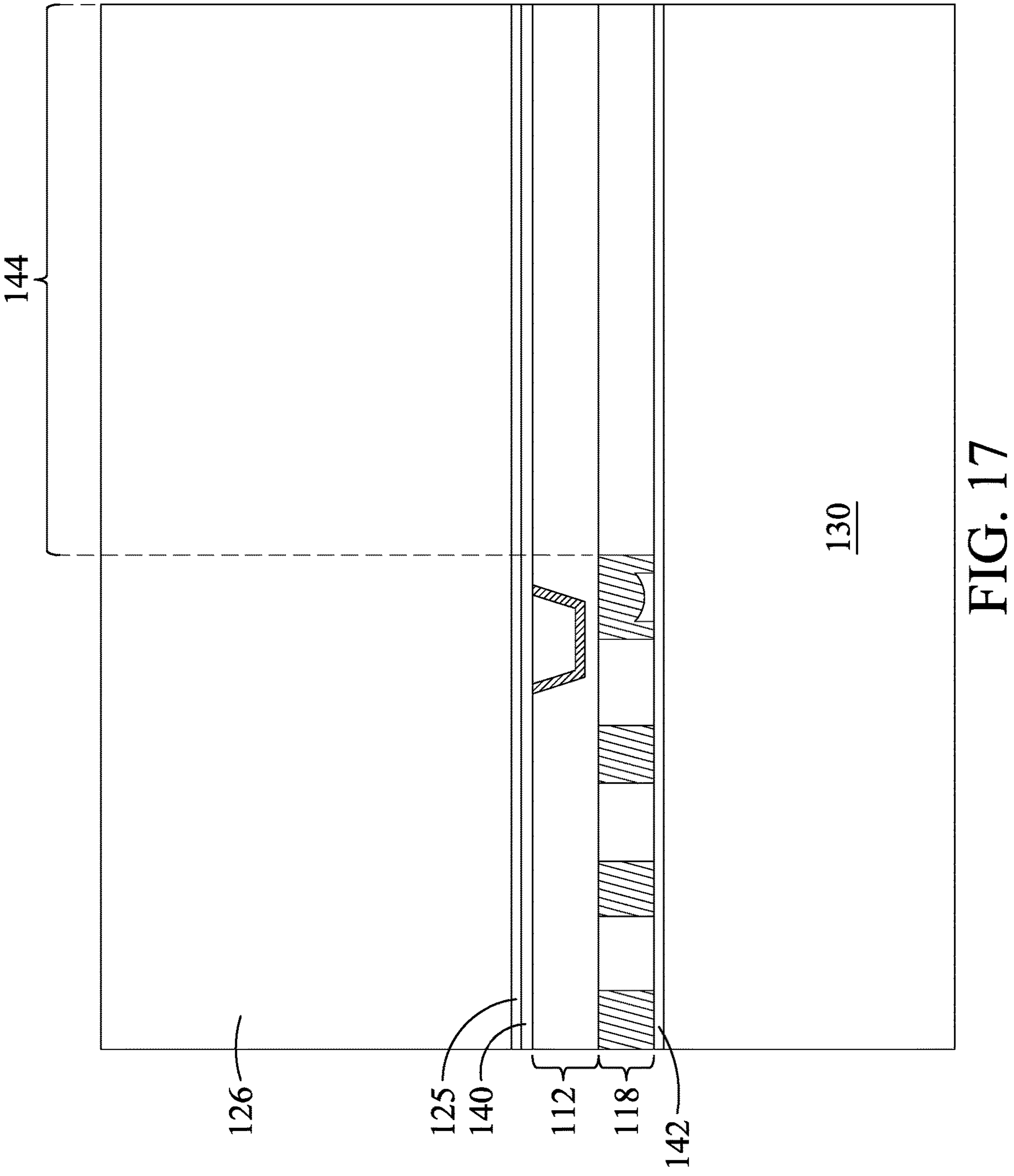

Next in FIG. 17, the resulting structure of FIG. 16 is bonded to a carrier board 130 through a bonding layer 142. The bonding layer 142 may comprise a material suitable for dielectric-to-dielectric bonding, in some cases. For example, the bonding layer 142 may be formed of or comprise a dielectric material, such as silicon oxide ($SiO_2$), SiN, SiON, SiOCN, SiC, SiCN, the like, or a combination thereof, and may be formed over the lens layer 118 or the carrier board 130 using CVD, HDPCVD, PECVD, LPCVD, ALD, or the like. Other suitable dielectric or bonding materials formed by any acceptable process may be used. In some embodiments, the material of the bonding layer 142 may be the same as or different from the material of the bonding layer 125. Additionally, FIG. 17 also illustrates an edge area 144 of the carrier board 130 where the optical fibers 106 of the FAU 102 are to be placed, and therefore this edge area 144 may also be referred to as a fiber placement area 144.

Figure 18:
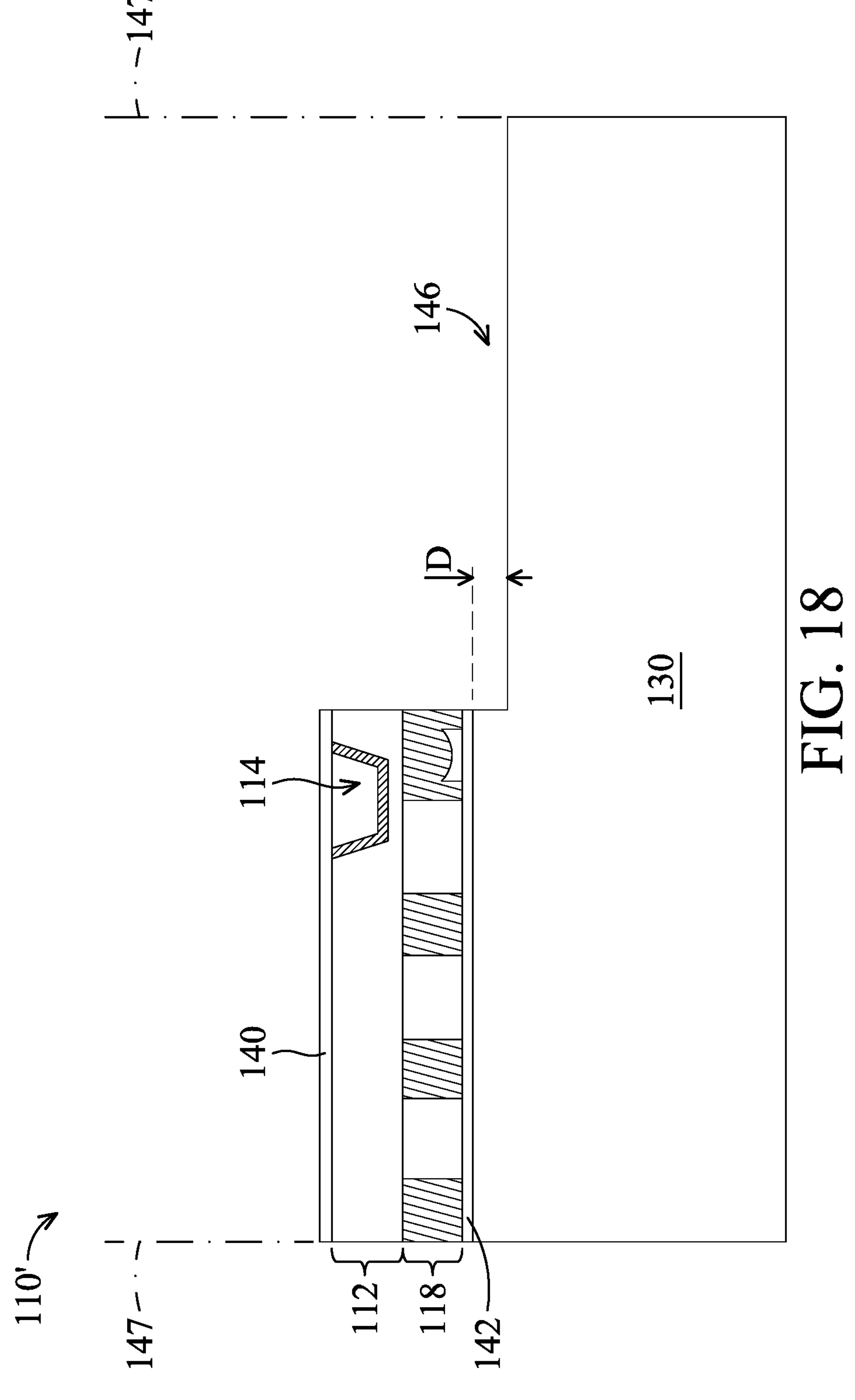

Next in FIG. 18, the temporary glass cover 126 and the bonding layer 125 are removed from the protection material 140 using a suitable removal process, such as a grinding process, an etching process, or another suitable removal process. Subsequently, another removal process (also referred to as a second removal process) is preformed to remove the structure layers (e.g., the protection material 140, the reflective layer 112, the lens layer 118, and the bonding layer 142) over the carrier board 130 in the edge area 144. The second removal process may comprise a grinding process, an etching process, or another suitable removal process. In some embodiments, the second removal process further removes a portion of the carrier board 130 in the edge area 144 to form a recess 146 for accommodating the optical fibers 106 (e.g., see FIG. 19). As mentioned above, the depth D of the recess 146 is determined by the diameter of the optical fibers 106. In other embodiments, the recess 146 is not present.

Still referring to FIG. 18, a singulation process is then performed to separate the light guide structures 110' formed on the same silicon substrate 101 into individual light guide structures 110' (for simplicity, only one light guide structure 110' is shown). The carrier board 130 under the light guide structures 110' is also cut through during the singulation process. The singulation process may include sawing through the scribe lines 147 using a mechanical saw, in some embodiments. Other suitable singulation processes may be used. In some embodiments, after singulation, the reflectors 114 and the silicon lenses 120 are embedded within the light guide structure 110' and are not exposed. In this manner, the risk of damage to the passive optical components (e.g., including the reflectors 114 and silicon lenses 120) of the light guide structure 110' during subsequent assembly steps may be reduced. In some embodiments, after singulation, the recess 146 (if present) of the carrier board 130 is adjacent to the light guide structure 110' above the carrier board 130.

Figure 19:
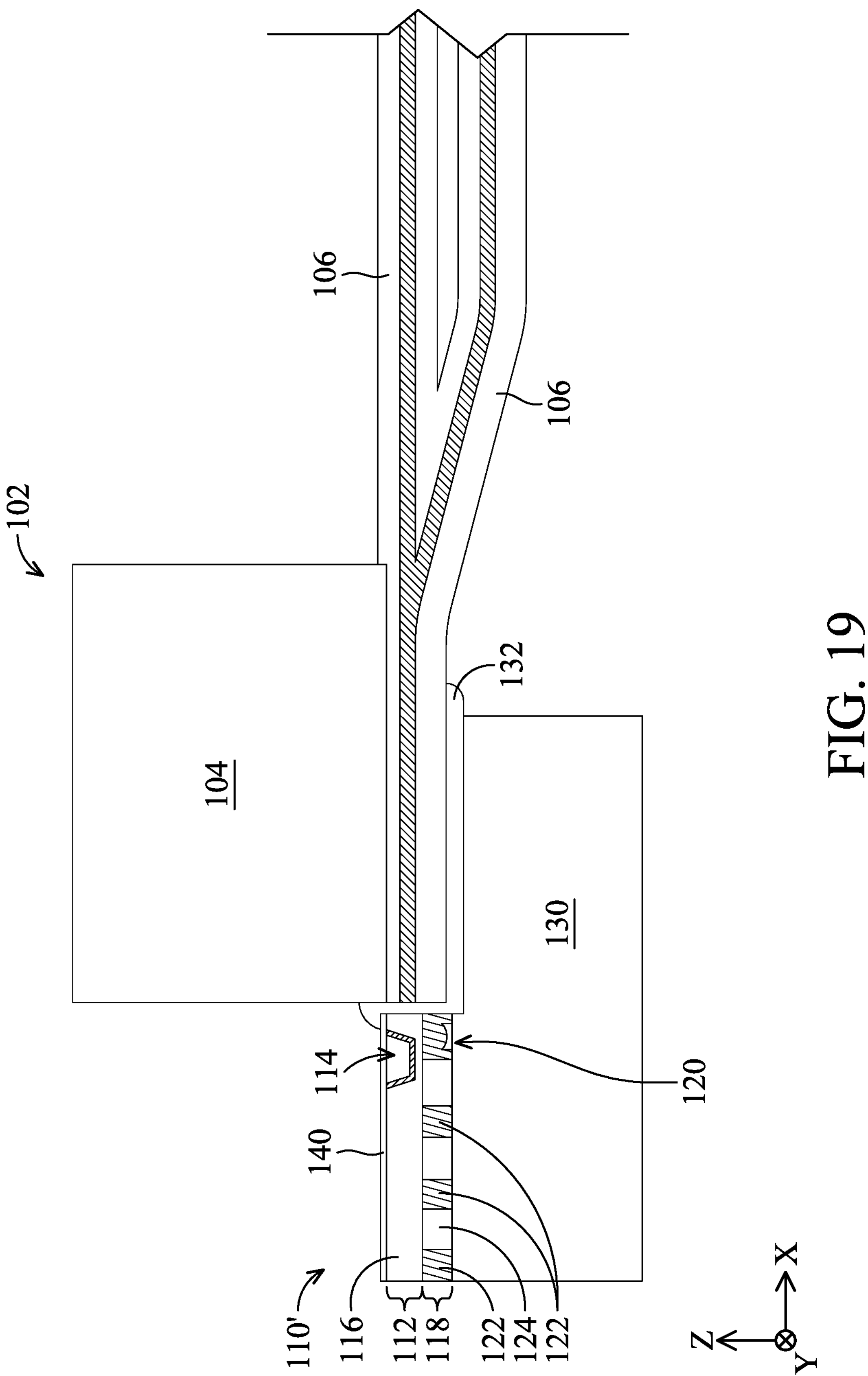

Next in FIG. 19, the FAU 102 is connected to the carrier board 130 using optical glue 132 to form the integrated FAU structure 300 previously described with reference to FIG. 13. Similarly, the carrier board 130 may act as a flat interface for the FAU structure 300 to connect the photonic package 620 (e.g., see FIG. 26), which helps improve the physical and optical coupling between the FAU structure 300 and the photonic package 620. In some embodiments, after the FAU 102 is placed on the top surface (e.g., in the fiber placement area 144) of the carrier board 130 or in the recess 146 of the carrier board 130 and the optical fibers 106 are aligned with the reflectors 114, the optical glue 132 may be dispensed into the gap between the optical fibers 106 and the carrier board 130. As mentioned above, the optical glue 132 may also extend into the gap between the sidewalls of the light guide structure 110' and the FAU 102 or extend on the top surface of the protection material 140, in some cases. The optical glue 132 may be applied in liquid form and then subsequently cured (e.g., by UV curing).

Figure 20:
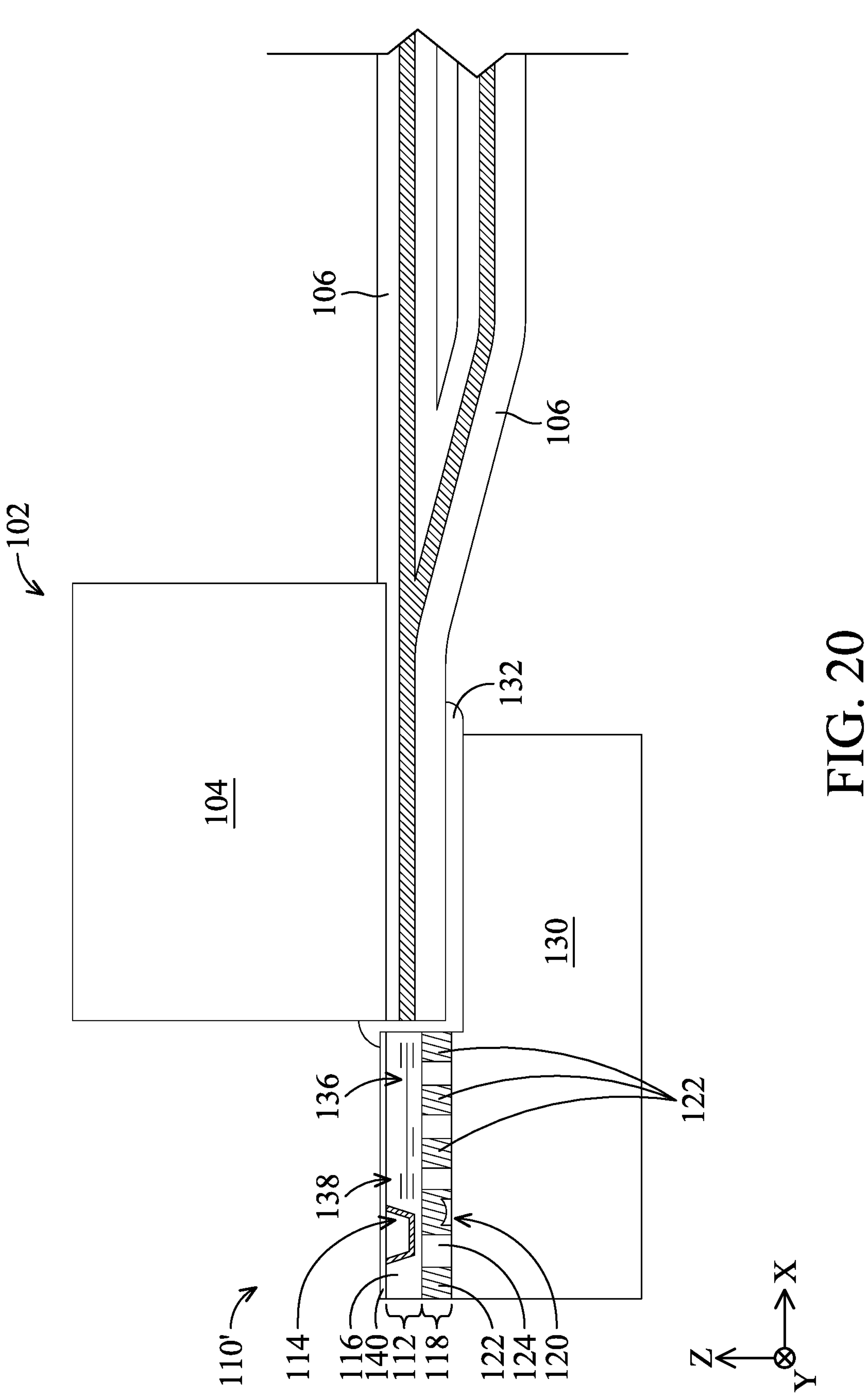
FIG. 20 illustrates a cross-sectional view of an integrated FAU structure, in accordance with some embodiments.

FIG. 20 illustrates a cross-sectional view of an integrated FAU structure 400, in accordance with some embodiments. The integrated FAU structure 400 is similar to the integrated FAU structure 300 of FIGS. 13 to 19, except that waveguides 136 and beam splitters 138 are further embedded within the reflective layer 112 of the light guide structure 110'. The waveguides 136 and beam splitters 138 are the same or similar to those shown in FIG. 12, and thus details regarding the waveguides 136 and beam splitters 138 are not repeated here. In other embodiments, the beam splitters 138 may be omitted.

Figure 21:
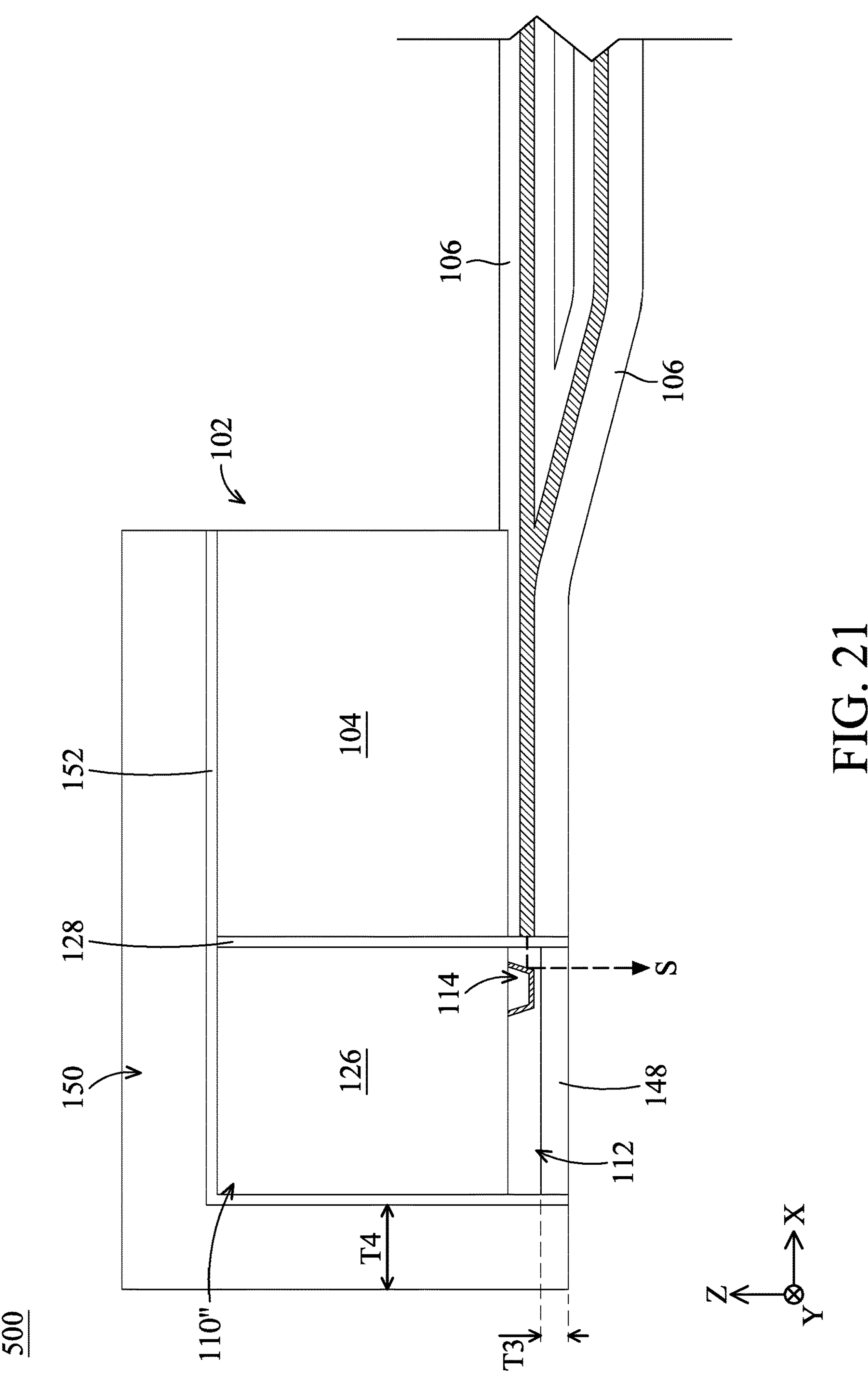
FIG. 21 illustrates a cross-sectional view of an integrated FAU structure, in accordance with some embodiments.

FIG. 21 illustrates a cross-sectional view of an integrated FAU structure 500, in accordance with some embodiments. The integrated FAU structure 500 consists of three parts: a FAU 102 that holds multiple optical fibers 106, a light guide structure 110", and an L-shaped carrier 150. The FAU 102 is the same or similar to the FAU 102 previously described with reference to FIGS. 1, 2A and 2B. During assembly, the FAU 102 and light guide structure 110" are connected using optical glue 128, and they are further connected to the L-shaped carrier 150 using optical glue 152.

The light guide structure 110" is similar to the light guide structure 110 of FIGS. 1 to 11, except that the lens layer 118 is not present, and a thin glass sheet 148 is disposed under the reflective layer 112. The thin glass sheet 148 is provided to allow the bottom surfaces of the light guide structure 110" and the optical fibers 106 of the FAU 102 to be substantially level or coplanar, which facilitates alignment of the reflectors 114 within the reflective layer 112 and the optical fibers 106 and attachment of the integrated FAU structure 500 to the photonic package 620 (e.g., see FIG. 26). For example, in some cases, the thickness T3 of the thin glass sheet 148 is in a range between about 30 μm and about 70 μm (such as about 50 μm), although other thicknesses may be used depending on the diameter of the optical fibers 106. Additionally, the glass material of the thin glass sheet 148 allows light (e.g., UV light) to pass through to cure the optical glue 636 (e.g., see FIG. 26) for attaching the FAU structure 500 to the photonic package 620 during the UV curing process.

Although not shown, in other embodiments, the reflective layer 112 of the light guide structure 110" may also include embedded waveguides and beam splitters (e.g., the waveguides 136 and the beam splitter 138 described above) in addition to the embedded reflectors 114.

The L-shaped carrier 150 is provided to mechanically support the light guide structure 110" and the FAU 102, thereby improving the structural stability of the integrated FAU structure 500. In some cases, the L-shaped carrier 150 placed above the light guide structure 110" and the FAU 102 allows force to be applied from above during assembly of the integrated FAU structure 500 so that the bottom surfaces of the light guide structure 110" and the optical fibers 106 of the FAU 102 are flush. Additionally, the vertical extension part of the L-shaped carrier 150 covers a sidewall of the light guide structure 110", which enables the optical components (e.g., the reflectors 114) within the light guide structure 110'" to be well protected. In some embodiments, the L-shaped carrier 150 comprises a UV-transparent material (e.g., glass or sapphire) to allow UV light to pass through during the UV curing process of the optical glue 636. In some cases, the thickness T4 of the L-shaped carrier 150 is in a range between about 300 μm and about 500 μm, although other thicknesses may be used.

Figure 22:
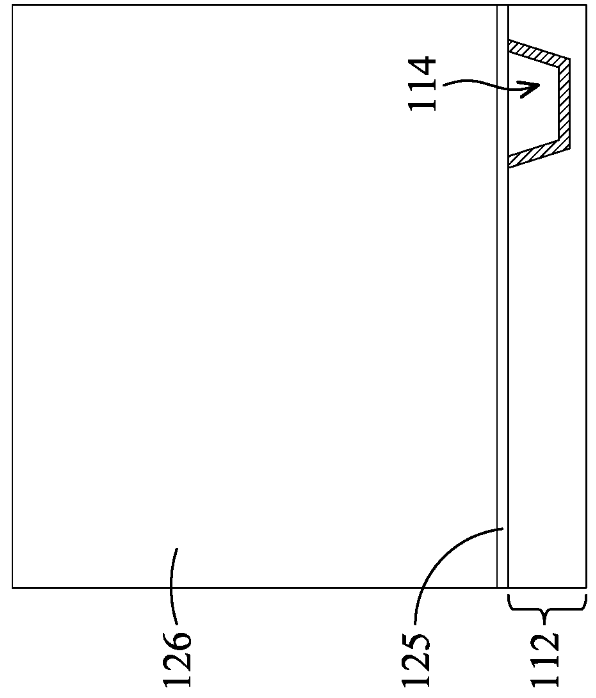
FIGS. 22 to 25 illustrate cross-sectional views of intermediate steps of forming the integrated FAU structure in FIG. 21, in accordance with some embodiments.

FIGS. 22 to 25 illustrate cross-sectional views of intermediate steps of forming the integrated FAU structure 500 in FIG. 21, in accordance with some embodiments. In FIG. 22, a structure similar to that shown in FIG. 6 is obtained, and then the silicon substrate 101 (see FIG. 6) below the reflective layer 112 is removed using a suitable removal process, such as a CMP process, a grinding process, an etching process, or another suitable removal process.

Figure 23:
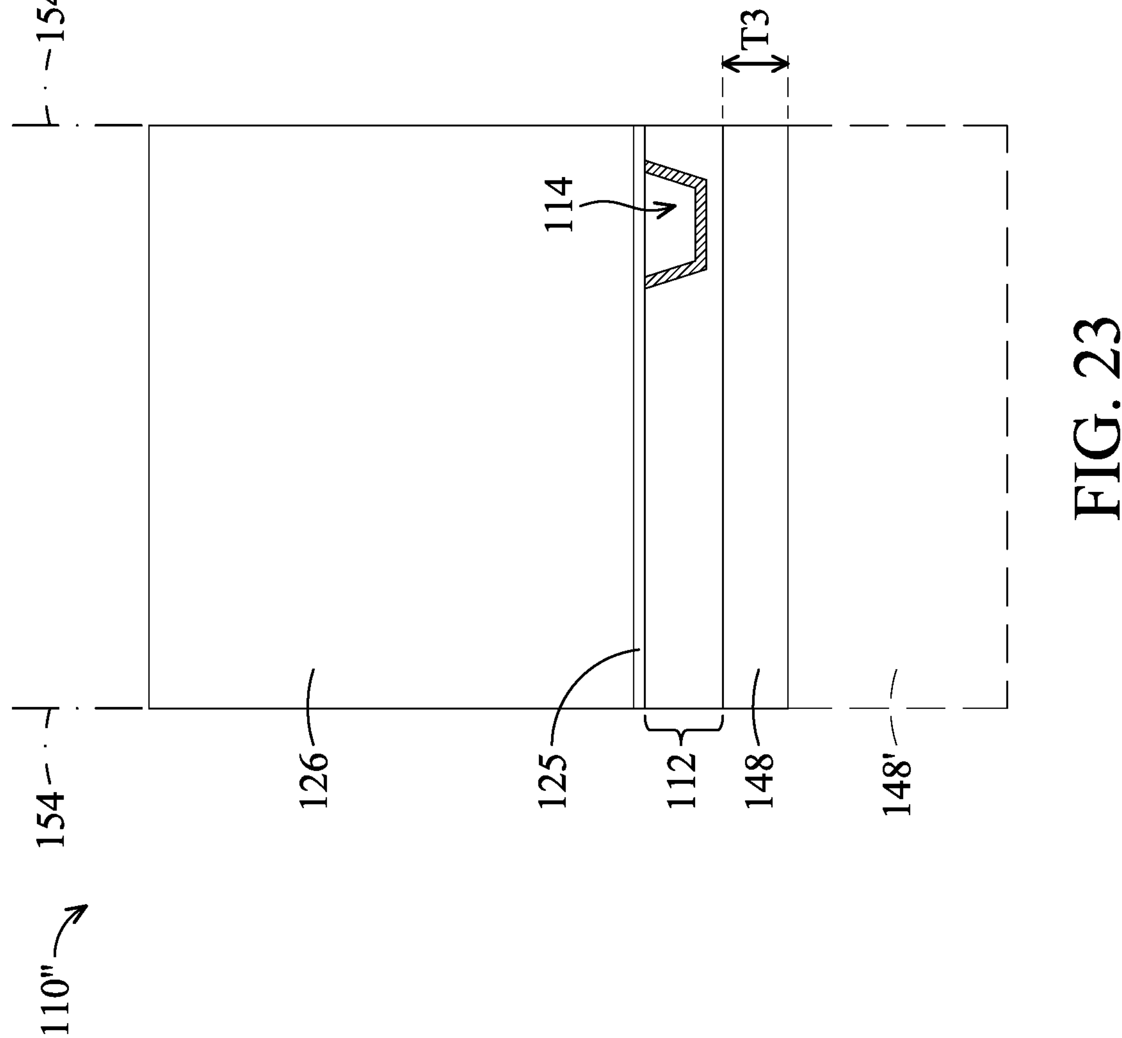

Next in FIG. 23, a glass substrate 148' is bonded to the bottom side of the reflective layer 112 through, for example, a bonding layer (not separately shown). The bonding layer may be the same or similar to the bonding layer 125 described above. The glass substrate 148' is then thinned to a thickness T3 (e.g., about 30 μm to about 70 μm, as described above) using a thinning process (e.g., a grinding process, an etching process, or another suitable process), forming a thin glass sheet 148 previously described in FIG. 21. As mentioned above, the thin glass sheet 148 is provided to compensate for the height difference between the bottom surfaces of the reflective layer 112 and the optical fibers 106 of the FAU 102, thereby facilitating alignment between the reflectors 114 within the reflective layer 112 and the optical fibers 106 (e.g., see FIG. 24).

Still referring to FIG. 23, a singulation process is then performed to separate the light guide structures 110" formed on the same silicon substrate 101 into individual light guide structures 110" (for simplicity, only one light guide structure 110" is shown). The thin glass sheet 148 is also cut through during the singulation process. The singulation process may include sawing through the scribe lines 154 using a mechanical saw, in some embodiments. Other suitable singulation processes may be used. In some embodiments, after singulation, the reflectors 114 are embedded within the light guide structure 110" and are not exposed. In this manner, the risk of damage to the passive optical components (e.g., including the reflectors 114) of the light guide structure 110" during subsequent assembly steps may be reduced. Although not shown, in other embodiments, various other passive optical components (e.g., the waveguides 136 and/or the beam splitter 138 described above) may be integrated into the reflective layer 112 to improve the optical performance, as discussed above.

Figure 24:
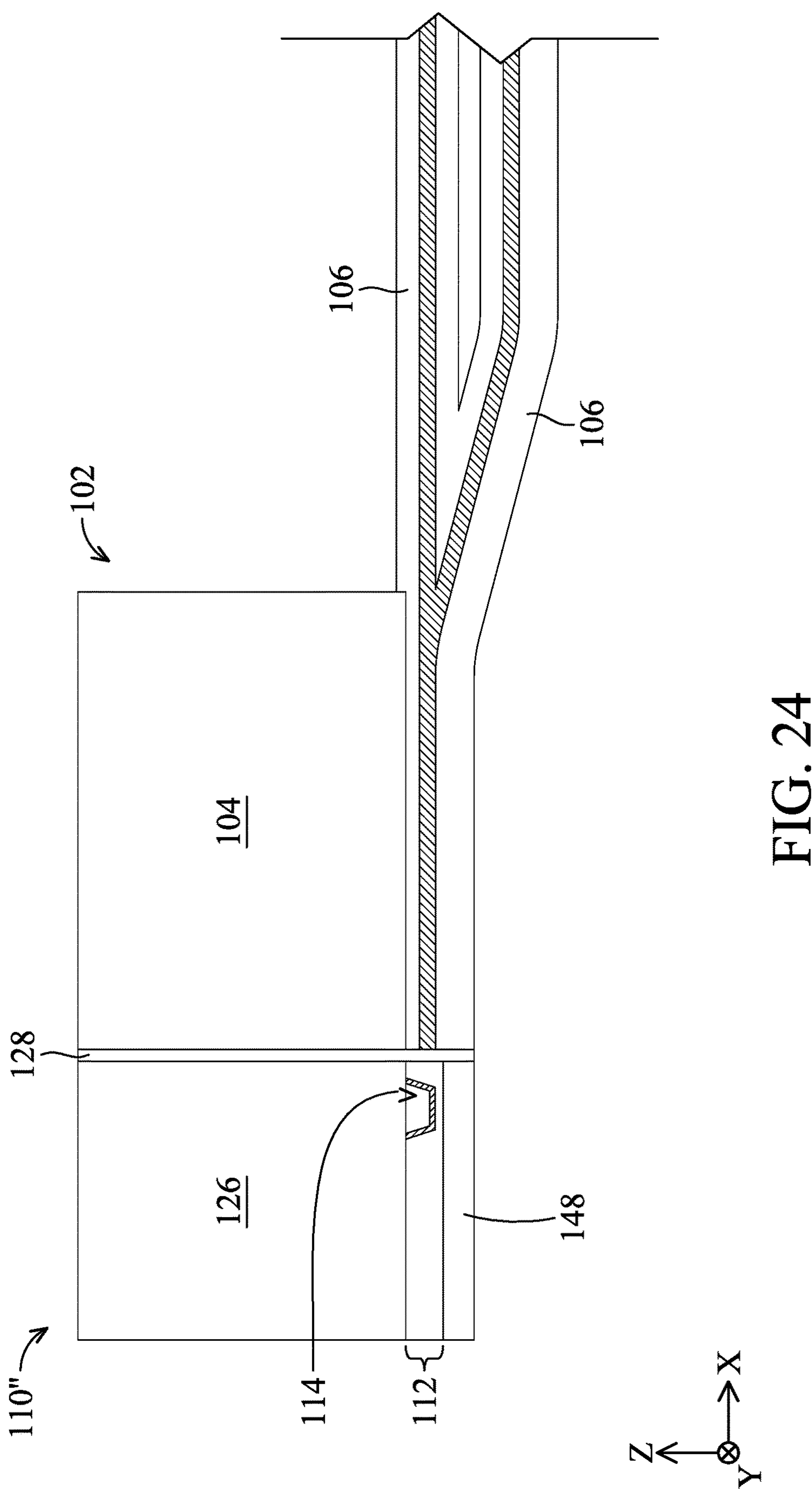

Next in FIG. 24, after the formation of the light guide structure 110", the FAU 102 and the light guide structure 110" are connected using optical glue 128. The connection method between the FAU 102 and the light guide structure 110" may be similar to the connection method between the FAU 102 and the light guide structure 110 illustrated in FIG. 10, so similar details will not be repeated here.

Figure 25:
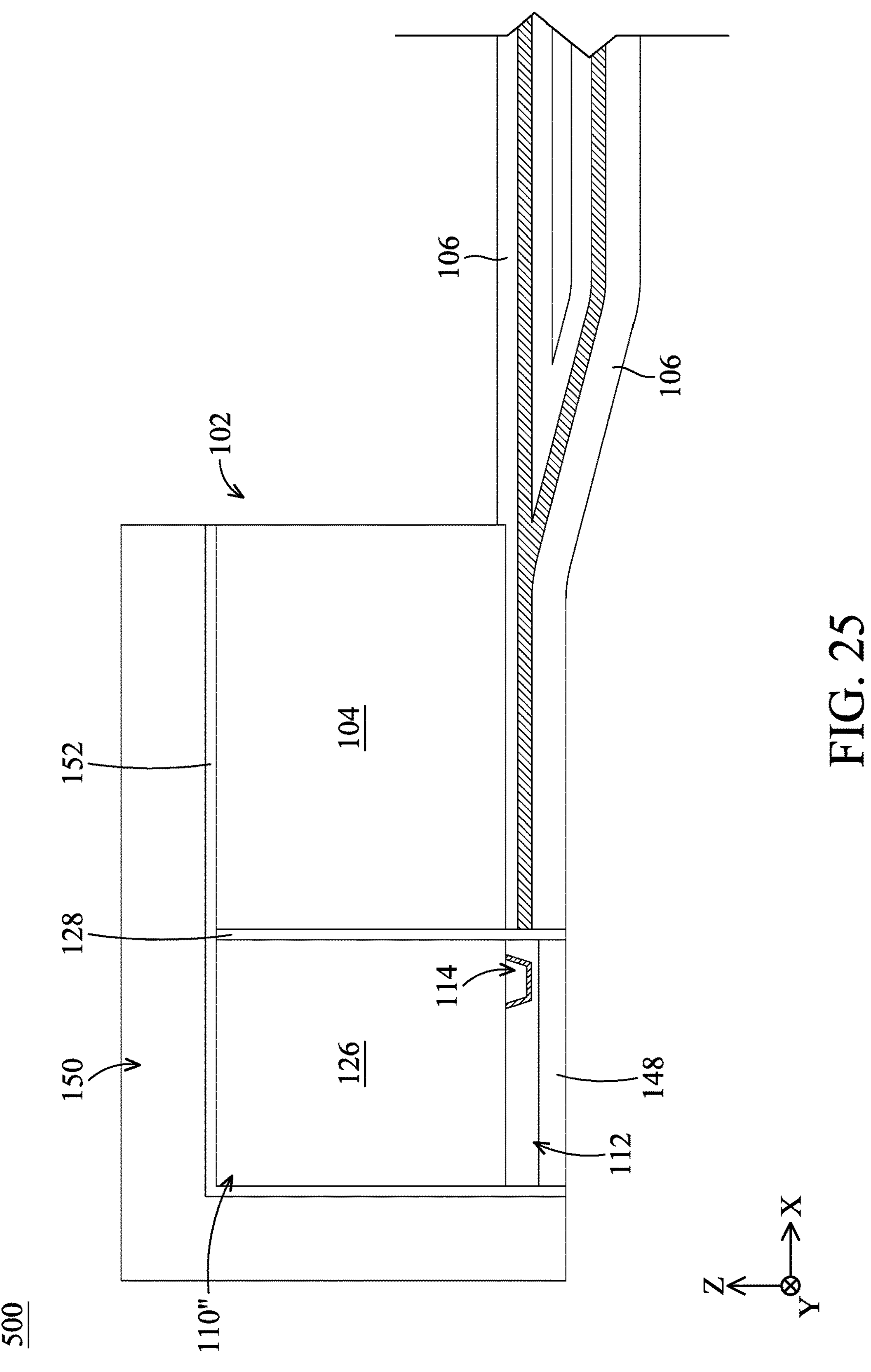

Next in FIG. 25, the resulting structure of FIG. 24 is connected to an L-shaped carrier 150 using optical glue 152 to form the integrated FAU structure 500 previously described with reference to FIG. 21. Similarly, the optical glue 152 may be dispensed in liquid form and then subsequently cured (e.g., by UV curing). The optical glue 152 may extend between the top surfaces of the FAU 102 and the light guide structure 110" and horizontal extension part of the L-shaped carrier 150, and may extend between the sidewall of the light guide structure 110" and the vertical extension part of the L-shaped carrier 150. The L-shaped carrier 150 enhances the structural stability of the integrated FAU structure 500 and protects the optical components (e.g., the reflectors 114) therein.

It should be understood that the structures, configurations and the manufacturing methods described herein are only illustrative, and are not intended to be, and should not be construed to be, limiting to the present disclosure. Many alternatives and modifications will be apparent to those skilled in the art, once informed by the present disclosure. For example, various features in the above-mentioned different embodiments can be combined arbitrarily.

FIG. 26 illustrates a cross-sectional view of a portion of a semiconductor package 600 (also referred to as a semiconductor system), in accordance with some embodiments. The semiconductor package 600 includes an integrated FAU structure (e.g., the FAU structure 200 shown in FIG. 12) that couples optical signals from a plurality of optical fibers 106 to a photonic package 620. In other embodiments, the FAU structure 200 may be replaced with the FAU structure 100, 300, 400 or 500 described above. Assembly of the FAU structure 200 within the semiconductor package 600 will be described later.

The semiconductor package 600 includes a package substrate 610, which is used to provide electrical connection between various semiconductor devices (e.g., the photonic package 620 described below and other devices not shown) packaged in the semiconductor package 600 and an external electronic device (not shown). In some embodiments, the package substrate 610 is a printed circuit board (PCB), which may be a core or core-less substrate. Details of the PCB are not illustrated herein. Other suitable package substrates may also be used. Various device elements (not shown), such as active or passive components (e.g., transistors, diodes, resistors, capacitors, inductors, etc.), may also be formed in or on the package substrate 610, in some embodiments. Although not shown, electrical connectors may be formed on the bottom of the package substrate 610 to enable electrical connection between the semiconductor package 600 and an external electronic device.

A photonic package 620 is attached (e.g., bonded) to the package substrate 610, in accordance with some embodiments. The photonic package 620 includes an electronic die 621 bonded to a photonic die 622. For simplicity, details of the electronic die 621 and photonic die 622 are not shown. The electronic die 621 may be, for example, a semiconductor device, die, or chip that communicates with the photonic die 622 using electrical signals. The electronic die 621 does not receive, transmit, or process optical signals. In contrast, the photonic die 622 can receive, transmit, or process optical signals, such as converting an optical signal into an electrical signal, or vice versa. Besides optical signals, the photonic die 622 may also transmit, receive, or process electrical signals.

In some embodiments, the electronic die 621 includes a substrate (e.g., a semiconductor substrate, such as silicon or the like), electronic components (e.g., transistors, diodes, capacitors, resistors, etc.) formed in and/or on the substrate, and an interconnect structure formed over the substrate for interconnecting the electronic components to form an integrated circuit. The photonic die 622 may include a substrate (e.g., a buried oxide ("BOX") substrate), photonic components (e.g., photodetectors, modulators, etc.), waveguides, optical couplers (e.g., grating couplers or edge couplers) and/or other photonic structures formed in and/or on the substrate, and an interconnect structure formed over the substrate and electrically connected to the photonic components. The photonic components, waveguides, and optical couplers may be optically coupled to form a "photonic integrated circuit (PIC)" for receiving, transmitting, or processing optical signals. The interconnect structures of the electronic die 621 and photonic die 622 may be electrically connected.

In some embodiments, the integrated circuit of the electronic die 621 may comprise controllers, drivers, transimpedance amplifiers, the like, or a combination thereof, for controlling the operation of the photonic components of the photonic die 622. In some embodiments, the electronic die 621 provides Serializer/Deserializer (SerDes) functionality. In this manner, the electronic die 621 may act as part of an I/O interface between optical signals and electrical signals within the photonic package 620.

The electronic die 621 may be bonded to the photonic die 622 by a suitable bonding process, such as by dielectric-to-dielectric bonding and/or metal-to-metal bonding (e.g., direct bonding, fusion bonding, oxide-to-oxide bonding, hybrid bonding, or the like), in some embodiments. Although not shown, bonding layers may be provided at the interface of the electronic die 621 and the photonic die 622 to facilitate the bonding process. Further details about the photonic package 620 are not described here.

In some embodiments, the photonic package 620 is bonded onto the contact pads (not shown) exposed at the upper surface of the package substrate 610 through electrical connectors 623. The electrical connectors 623 may include conductive pillars, solder balls, controlled collapse chip connection (C4) bumps, micro bumps, one or more other suitable bonding structures, or a combination thereof. An underfill layer 624 may be formed in the gap between the photonic package 620 and the package substrate 610 to surround and protect the electrical connectors 623 and enhance the connection between the photonic package 620 and the package substrate 610. In some embodiments, a metal lid 630 is attached to top surface of the package substrate 610 through adhesive 632, which helps reduce warpage of the package substrate 610. The metal lid 630 may also be attached to the photonic package 620 through thermal interface material (TIM) 634 to help dissipate heat. In some embodiments, the metal lid 630 further has an opening 631 (depicted by dashed lines) that allow for the subsequent attachment of the integrated FAU structure 200 to the photonic package 620. In other embodiments, the metal lid 630 may be replaced by a stiffener ring.

In some embodiments, assembly of the integrated FAU structure 200 and the photonic package 620 may include placing the FAU structure 200 over the exposed surface of the photonic package 620 through the opening 631 of the metal lid 630, aligning the reflectors 114 (or the silicon lenses 120, if present) of the FAU structure 200 with the optical couplers (not shown) within the photonic package 620, dispensing optical glue 636 into the gap between the FAU structure 200 and the photonic package 620, and then curing (e.g., UV curing) the optical glue 636.

Due to the above structural design of the integrated FAU structure 200, optical signals from the optical fibers 106 can be directed (e.g., redirected) by the reflectors 114 within the reflective layer 112 to the underlying lens layer 118, then through the silicon lens 120 and the carrier board 130, then into the photonic package 620, and then reaching the optical couplers (e.g., grating couplers or edge couplers, not shown) within the photonic package 620, as indicated by optical path S in FIG. 26. Optical coupling between the optical fibers 106 of the integrated FAU structure 200 and the optical couplers within the photonic package 620 is thus achieved. Although not shown, one or more lenses and/or reflectors may further be provided in the photonic package 620 to facilitate such optical coupling, in some cases.

Embodiments of the FAU structure discussed herein may have advantages. By integrating the FAU holding optical fibers and the light guide structure (which may include various passive optical components such as reflectors, lens, waveguides, and/or beam splitters), it eliminates the need for additional passive optical components outside of the FAU structure, thus reducing the area occupied by these optical components within the semiconductor package. As a result, the package size of the semiconductor package/system can be reduced. Because the passive optical components are embedded within the light guide structure and are not exposed, the risk of damage to those optical components during assembly of the FAU structure and the photonic package is also reduced. Accordingly, the product yield and reliability of the integrated FAU structure are improved. In some embodiments, a carrier board or an L-shaped carrier is included to provide mechanical support for the FAU and the light guide structure, thereby enhancing the structural stability of the integrated FAU structure. Also, the bottom of the integrated FAU structure may comprise a UV-transparent material (e.g., glass or sapphire) to allow UV light to pass through, which facilitates the UV curing process of the optical glue used to attach the FAU structure to the photonic package.

In accordance with some embodiments, a fiber array unit (FAU) structure is provided. The FAU structure includes a FAU, a passive optical component structure, and a carrier board. The FAU includes a fiber holder holding multiple optical fibers. The passive optical component structure includes a reflective layer and a lens layer. The reflective layer includes multiple reflectors adjacent to the optical fibers. The lens layer includes multiple silicon lenses adjacent to the reflectors. The carrier board is configured to support the FAU and the passive optical component structure. The FAU and the passive optical component structure are adjacent to each other. The lens layer is located between the reflective layer and the carrier board.

In accordance with some embodiments, a method of forming a fiber array unit (FAU) structure is provided. The method includes forming a reflective layer over a silicon substrate, wherein the reflective layer comprises multiple reflectors embedded within a dielectric layer. The method includes bonding a glass cover to the side of the reflective layer opposite the silicon substrate. The method includes thinning the silicon substrate to form a thinned silicon substrate. The method includes etching the thinned silicon substrate to form a silicon lens layer including multiple silicon lenses. The method includes performing a singulation process to cut through the glass cover, the reflective layer, and the silicon lens layer to separate multiple passive optical component structures. The method includes providing a fiber array unit (FAU). The method includes attaching the FAU and the passive optical component structure to a carrier board, wherein the FAU and the passive optical component structure are adjacent to each other.

In accordance with some embodiments, a method of forming a fiber array unit (FAU) structure is provided. The method includes forming a reflective layer over a silicon substrate, wherein the reflective layer comprises multiple reflectors embedded within a dielectric layer. The method includes forming a protection layer on the side of the reflective layer opposite the silicon substrate. The method includes bonding a glass cover to the protection layer. The method includes thinning the silicon substrate to form a thinned silicon substrate. The method includes etching the thinned silicon substrate to form a silicon lens layer including multiple silicon lenses. The method includes bonding a carrier board to the side of the silicon lens layer opposite the reflective layer. The method includes removing the glass cover. The method includes removing the protection layer, the reflective layer, and the silicon lens layer over the carrier board in a fiber placement area of the carrier board. The method includes cutting through the protection layer, the reflective layer, the silicon lens layer, and the carrier board to separate multiple passive optical component structures, wherein each of the passive optical component structures is bonded to the carrier board after performing the cutting. The method includes providing a fiber array unit (FAU). The method includes attaching the FAU to the fiber placement area of the carrier board.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A fiber array unit (FAU) structure, comprising:

a fiber array unit (FAU) comprising a fiber holder that holds a plurality of optical fibers;

a passive optical component structure, comprising:

a reflective layer comprising a plurality of reflectors, wherein the plurality of reflectors is adjacent to the plurality of optical fibers, wherein the reflective layer further comprises a dielectric layer, and the plurality of reflectors is embedded within the dielectric layer; and a lens layer comprising a plurality of silicon lenses, wherein the plurality of silicon lenses is adjacent to the plurality of reflectors; and a carrier board configured to support the FAU and the passive optical component structure, wherein the FAU and the passive optical component structure are adjacent to each other, and wherein the lens layer is located between the reflective layer and the carrier board.

2. The FAU structure as claimed in claim 1, wherein the fiber holder has a plurality of grooves formed on a lower surface of the fiber holder to hold the plurality of optical fibers, wherein the plurality of optical fibers is located between the fiber holder and the carrier board.

3. The FAU structure as claimed in claim 1, wherein the reflective layer further comprises a plurality of waveguides and a plurality of beam splitters embedded within the dielectric layer.

4. The FAU structure as claimed in claim 1, wherein the lens layer is a silicon lens layer, and further comprises a plurality of silicon pillars and a gap-filling material that fills gaps between the silicon pillars and between the silicon pillars and the silicon lenses.

5. The FAU structure as claimed in claim 1, wherein the passive optical component structure further comprises a glass cover disposed on a side of the reflective layer opposite the lens layer.

6. The FAU structure as claimed in claim 1, wherein the passive optical component structure further comprises a passivation layer disposed on a side of the reflective layer opposite the lens layer.

7. The FAU structure as claimed in claim 1, further comprising:

a first optical glue disposed between sidewalls of the passive optical component structure and the FAU; and a second optical glue disposed between bottom surfaces of the passive optical component structure and the FAU and a top surface of the carrier board.

8. The FAU structure as claimed in claim 1, wherein the passive optical component structure is bonded to a top surface of the carrier board through a bonding layer, and the FAU is attached to the top surface of the carrier board through optical glue, and wherein the optical glue further extends into a gap between sidewalls of the passive optical component structure and the plurality of optical fibers.

9. The FAU structure as claimed in claim 8, wherein the carrier board has a recess formed on the top surface of the carrier board to accommodate the optical fibers.

10. A method of forming a fiber array unit (FAU) structure, comprising:

forming a reflective layer over a silicon substrate, wherein the reflective layer comprises a plurality of reflectors embedded within a dielectric layer;

bonding a glass cover to a side of the reflective layer opposite the silicon substrate;

thinning the silicon substrate to form a thinned silicon substrate;

etching the thinned silicon substrate to form a silicon lens layer comprising a plurality of silicon lenses;

performing a singulation process to cut through the glass cover, the reflective layer, and the silicon lens layer to separate a plurality of passive optical component structures;

providing a fiber array unit (FAU); and attaching the FAU and the passive optical component structure to a carrier board, wherein the FAU and the passive optical component structure are adjacent to each other.

11. The method as claimed in claim 10, further comprising, before attaching the FAU and the passive optical component structure to the carrier board, connecting the FAU and the passive optical component structure using a first optical glue, and attaching the FAU and the passive optical component structure to the carrier board using a second optical glue.

12. The method as claimed in claim 11, further comprising performing an alignment process to align the plurality of reflectors of the reflective layer of the passive optical component structure with a plurality of optical fibers of the FAU before connecting the FAU and the passive optical component structure using the first optical glue.

13. The method as claimed in claim 10, wherein forming the silicon lens layer further comprises;

etching the thinned silicon substrate to form a plurality of silicon pillars;

filling gaps between the plurality of silicon pillars and between the silicon pillars and the silicon lens with a gap-filling material; and performing a planarization process to remove an excess portion of the gap-filling material along bottom surfaces of the silicon pillars.

14. The method as claimed in claim 10, wherein the carrier board comprises an ultraviolet (UV)-transparent material that allows UV light to pass through.

15. A method of forming a fiber array unit (FAU) structure, comprising:

forming a reflective layer over a silicon substrate, wherein the reflective layer comprises a plurality of reflectors embedded within a dielectric layer;

forming a protection layer on a side of the reflective layer opposite the silicon substrate;

bonding a glass cover to the protection layer;

thinning the silicon substrate to form a thinned silicon substrate;

etching the thinned silicon substrate to form a silicon lens layer comprising a plurality of silicon lenses;

bonding a carrier board to a side of the silicon lens layer opposite the reflective layer;

removing the glass cover;

removing the protection layer, the reflective layer, and the silicon lens layer over the carrier board in a fiber placement area of the carrier board;

cutting through the protection layer, the reflective layer, the silicon lens layer, and the carrier board to separate a plurality of passive optical component structures, wherein each of the plurality of passive optical component structures is bonded to the carrier board after performing the cutting;

providing a fiber array unit (FAU); and attaching the FAU to the fiber placement area of the carrier board.

16. The method as claimed in claim 15, further comprising, before performing the cutting, forming a recess on a top surface of the carrier board by removing a portion of the carrier board in the fiber placement area, and wherein the recess of the carrier board is configured to accommodate a plurality of optical fibers of the FAU.

17. The method as claimed in claim 15, wherein the FAU is attached to the fiber placement area of the carrier board using optical glue, and wherein the optical glue further extends into a gap between sidewalls of the passive optical component structure and the plurality of optical fibers.

18. The method as claimed in claim 17, wherein the optical glue further extends on a top surface of the protection layer.

19. The method as claimed in claim 15, wherein the reflective layer further comprises a plurality of waveguides and a plurality of beam splitters embedded within the dielectric layer.

20. The FAU structure as claimed in claim 1, wherein the reflective layer is in contact with the lens layer.

* * * * *